US012706310B2

(12) United States Patent
Li et al.

(10) Patent No.: US 12,706,310 B2
(45) Date of Patent: Aug. 11, 2026

(54) BATTERY, POSITIVE ELECTRODE PLATE, POSITIVE ELECTRODE SLURRY, AND DISPERSANT AND PREPARATION METHOD THEREOF

(71) Applicant: Contemporary Amperex Technology (Hong Kong) Limited, Hong Kong (CN)

(72) Inventors: Hanghao Li, Ningde (CN); Hanwen Shi, Ningde (CN); Xinghui Wang, Ningde (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 0 days.

(21) Appl. No.: 19/264,873

(22) Filed: Jul. 10, 2025

(65) Prior Publication Data

US 2026/0024766 A1 Jan. 22, 2026

Related U.S. Application Data

(63) Continuation of application No. PCT/CN2024/124476, filed on Oct. 12, 2024.

(30) Foreign Application Priority Data

Jul. 17, 2024 (CN) ......................... 202410961343.8

(51) Int. Cl.
*H01M 4/62* (2006.01)
*C08G 63/20* (2006.01)
(Continued)

(52) U.S. Cl.
CPC .............. *H01M 4/62* (2013.01); *C08G 63/20* (2013.01); *C08G 63/672* (2013.01);
(Continued)

(58) Field of Classification Search
None
See application file for complete search history.

(56) References Cited

U.S. PATENT DOCUMENTS 5,760,257 A * 6/1998 Tanaka ...................... C08F 8/00 525/445
9,397,330 B2 * 7/2016 Kwon ..................... H01M 4/13
(Continued)

FOREIGN PATENT DOCUMENTS

CN 102106023 B * 7/2014 .............. H01M 4/13
CN 110804365 A 2/2020
(Continued)

OTHER PUBLICATIONS

English Translation for CN_102106023_B (Year: 2014).*
(Continued)

*Primary Examiner* — Anca Eoff
*Assistant Examiner* — Dustin Van Kirk
(74) *Attorney, Agent, or Firm* — K&L Gates LLP

(57) ABSTRACT

A battery, a positive electrode plate, a positive electrode slurry, a dispersant and its preparation method, and an electric device are disclosed. The battery includes a positive electrode plate having a current collector and a positive electrode material layer on at least one side. The material layer contains a positive electrode active material and a dispersant. The dispersant comprises a polyester compound that includes structural unit A and/or structural unit B. Structural unit A and B are defined by specific chemical formulas,

, (Continued)

-continued

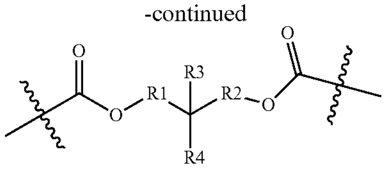

where R1 and R2 are each selected from and C0, C1-C18 alkyl, and C6-C18 aryl groups; R3 and R4 are each selected from H, C1-C18 alkyl, C6-C18 aryl, or ester groups aryl, or ester groups. The dispersant improves the dispersion performance of the positive electrode slurry and enhances the uniformity and flexibility of the positive electrode plate, thereby contributing to higher capacity and improved stability of the battery.

18 Claims, 2 Drawing Sheets

(51) Int. Cl.

| | |
|---|---|
| ***C08G 63/672*** | (2006.01) |
| ***C08G 63/91*** | (2006.01) |
| ***C09D 5/24*** | (2006.01) |
| ***C09D 7/45*** | (2018.01) |
| ***C09D 7/65*** | (2018.01) |
| ***H01M 4/02*** | (2006.01) |
| ***H01M 4/58*** | (2010.01) |

(52) U.S. Cl.

CPC ............ *C08G 63/916* (2013.01); *C09D 5/24* (2013.01); *C09D 7/45* (2018.01); *C09D 7/65* (2018.01); *H01M 2004/028* (2013.01); *H01M 4/5825* (2013.01); *H01M 2220/20* (2013.01)

(56) References Cited

U.S. PATENT DOCUMENTS

| | | | | |
|---|---|---|---|---|
| 9,598,602 | B2 * | 3/2017 | Kuo | C09D 167/02 |
| 2003/0018100 | A1 * | 1/2003 | Foucher | C09D 11/30<br>523/160 |
| 2016/0251523 | A1 * | 9/2016 | Shooter | C09D 7/45<br>524/590 |
| 2019/0382527 | A1 * | 12/2019 | Tajiri | C08J 5/00 |
| 2022/0041858 | A1 * | 2/2022 | Noro | C08L 23/06 |

FOREIGN PATENT DOCUMENTS

| | | | | | |
|---|---|---|---|---|---|
| CN | 112151853 | A | | 12/2020 | |
| CN | 116589671 | A | | 8/2023 | |
| CN | 116670234 | A | * | 8/2023 | C08L 101/16 |
| CN | 117637997 | A | | 3/2024 | |
| JP | H10500446 | A | | 1/1998 | |
| JP | 2013043159 | A | * | 3/2013 | |
| KR | 20110052233 | A | * | 5/2011 | H01M 4/02 |
| KR | 20240026748 | A | * | 2/2024 | H01M 4/139 |
| TW | 200838886 | A | | 10/2008 | |
| WO | WO-2016066173 | A1 | * | 5/2016 | C04B 35/632 |
| WO | WO-2016136090 | A1 | * | 9/2016 | H01M 4/139 |

OTHER PUBLICATIONS

English Translation for CN_116670234_A (Year: 2023).*

English Translation for WO_2016136090_A1 (Year: 2016).*

Lu et al. "Synthesis and Characterization of Waterborne Sulfonate Polyesters" (Year: 2023).*

International Search Report in the international application No. PCT/CN2024/124476, mailed on Mar. 18, 2025, 5 pages with English translation.

* cited by examiner

BATTERY, POSITIVE ELECTRODE PLATE, POSITIVE ELECTRODE SLURRY, AND DISPERSANT AND PREPARATION METHOD THEREOF

CROSS-REFERENCE TO RELATED APPLICATIONS

This application is a continuation of International Application PCT/CN2024/124476, filed on Oct. 12, 2024, which claims priority to Chinese patent application No. 202410961343.8, filed on Jul. 17, 2024 and entitled "BATTERY, POSITIVE ELECTRODE PLATE, POSITIVE ELECTRODE SLURRY, AND DISPERSANT AND PREPARATION METHOD THEREOF", which is incorporated herein by reference in its entirety.

TECHNICAL FIELD

This application relates to the field of new energy technologies, and in particular, to a battery, a positive electrode plate, a positive electrode slurry, a dispersant and a preparation method thereof, and an electric device.

BACKGROUND

Lithium-ion batteries have a high energy density and are widely used in wireless communication, transportation, aerospace, and other fields. In the preparation process of lithium-ion batteries, a positive electrode plate is typically prepared by applying a positive electrode slurry onto a current collector and drying it. Therefore, the properties of the positive electrode slurry affect the electrochemical performance and stability of the positive electrode plate, thereby impacting the performance of the battery.

Insufficient dispersion performance of the positive electrode slurry may reduce the uniformity of the positive electrode plate, leading to capacity loss of the battery. Additionally, when the coating thickness and compacted density of the positive electrode slurry are large, it can result in increased brittleness, reduced stability, and a higher likelihood of cracking of the positive electrode plate. The above statements are provided only for background information related to this application and do not necessarily constitute the prior art.

SUMMARY

The main purpose of this application is to provide a battery, a positive electrode plate, a positive electrode slurry, a dispersant and a preparation method thereof, and an electric device, which can improve the dispersion performance of the positive electrode slurry, and enhance the uniformity and flexibility of the positive electrode plate, thereby providing the battery with a high capacity retention rate and stability.

In view of this, a technical solution adopted in this application is: providing a battery, where the battery includes a positive electrode plate, the positive electrode plate includes a current collector and a positive electrode material layer provided on at least one side of the current collector, the positive electrode material layer includes a positive electrode active material and a dispersant, the dispersant includes a polyester compound, the polyester compound includes a structural unit A and/or a structural unit B, the structural unit A has a chemical formula of

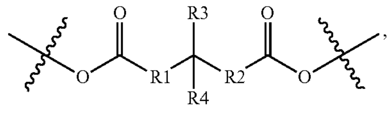

, and the structural unit B has a chemical formula of

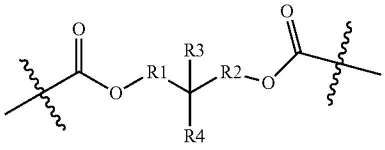

;

where R1 and R2 are each selected from at least one of C0, a C1-C18 alkyl group, and a C6-C18 aryl group; and R3 and R4 are each selected from H, a C1-C18 alkyl group, a C6-C18 aryl group, and an ester group.

In this embodiment, the provided dispersant is selected to be a polymer with a polyester backbone, where the ester group in the polyester is a highly polar group that can produce strong polarization; furthermore, a solvated segment can be introduced into a side chain of the polyester to allow the side chain to fully extend in a solvent system, which can improve the dispersion performance of the positive electrode slurry and enhance the uniformity of the positive electrode plate; moreover, a carbon chain between the ester groups can freely rotate, improving the flexibility of the electrode plate, and thereby providing the battery with a high capacity retention rate and stability.

In one embodiment, the ester group has a chemical formula of

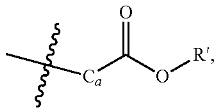

, where $0 \leq a \leq 6$, and R' is selected from any one of a C1-C18 alkyl group, a C6-C18 aryl group, a polyoxyethylene ether segment, and a polyoxyethylene ether polyoxypropylene ether copolymer segment. In this embodiment, a carbon chain or polyether segment is introduced to serve as a solvated segment to fully extend in a solvent system. This creates a steric hindrance effect that enhances dispersion capability and subsequent stabilization, preventing the particles from re-aggregating after being fully dispersed.

In one embodiment, the polyoxyethylene ether polyoxypropylene ether copolymer segment includes

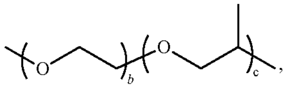

, where $3 \leq b \leq 60$ and $0 \leq c \leq 60$. The polyoxyethylene ether polyoxypropylene ether copolymer segment can serve as a solvated segment, with a degree of polymerization within the above range, providing a good solvation effect and enhancing dispersion performance.

In one embodiment, the positive electrode active material includes one or more of lithium iron phosphate and lithium manganese iron phosphate, which can improve the stability of battery performance.

In one embodiment, a coating weight of the positive electrode material layer is in a range of 300 g/1540.25 $mm^2$-450 g/1540.25 $mm^2$. In this embodiment, the flexibility of the electrode plate is improved.

In one embodiment, a compacted density of the positive electrode material layer is in a range of 2.4 $g/cm^3$-2.8 $g/cm^3$. In this embodiment, the flexibility of the electrode plate is improved.

In one embodiment, a sheet resistance of the positive electrode plate is in a range of 0.05Ω-0.3Ω. The sheet resistance of the positive electrode plate is small, which helps to reduce an internal resistance of the battery.

In one embodiment, the polyester compound includes a structural unit C and/or a structural unit D, the structural unit C has a chemical formula of

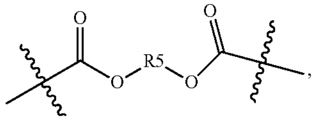

and the structural unit D has a chemical formula of

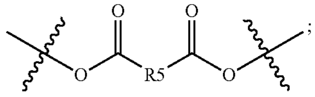

where R5 is selected from any one of a C1-C18 alkyl group and a C6-C18 aryl group. In this embodiment, the provided polyester compound may be formed by polycondensation of a polyacid with a diol, or by polycondensation of a polyol with a diacid, where a carbon chain between two ester groups in a polyester compound molecule can freely rotate, providing a certain flexibility. Through regulation of the carbon chain, the flexibility effect can be controlled.

In one embodiment, the polyester compound further includes at least one substituent group G, and G includes any one of a carboxyl group and a derivative thereof, a sulfonic acid group and a derivative thereof, and a phosphonic acid group and a derivative thereof. The substituent group G can ionize to release a negative ion, which then adsorbs onto a surface of the active material through positive and negative charge interactions, causing electrostatic repulsion between material particles to achieve dispersion; alternatively, the substituent group G is a polar group that can generate strong interactions with the material surface, maintaining certain distances between material particles, thereby further enhancing the dispersion effect of the dispersant.

In one embodiment, G is a terminal group of the polyester compound. Through this arrangement, the dispersant can better interact with the active material, enhancing the dispersion effect.

In one embodiment, the carboxyl group and the derivative thereof have a chemical formula of

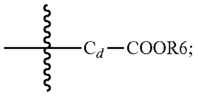

and/or the sulfonic acid group and the derivative thereof have a chemical formula of

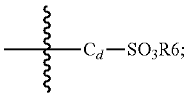

where a value of d ranges from greater than 1 and less than or equal to 12, and R6 is selected from any one of H, an alkyl group, alkyl alcohol, alkyl hydroxylamine, a fatty ester group, and an aromatic ester group; where the alkyl group has a chemical formula of

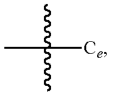

the alkyl alcohol has a chemical formula of

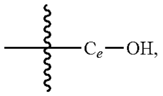

the alkyl hydroxylamine has a chemical formula of

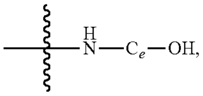

the fatty ester group has a chemical formula of

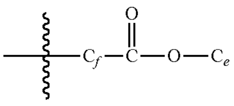 or 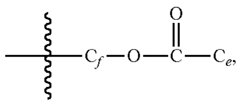

the aromatic ester group has a chemical formula of

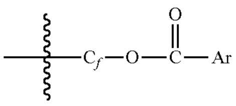 or 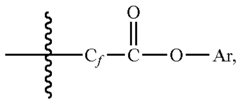

a value of e is in a range of 1-12, a value of f is in a range of 1-16, and carbon atoms in Ar have a quantity of not exceeding 12.

In this embodiment, $C_d$ is a carbon atom chain that can serve as a solvated segment to achieve a solvation effect; when R6 is H, the above group can ionize to release a negative ion, which then adsorbs onto a surface of the active material through positive and negative charge interactions, causing electrostatic repulsion between material particles to achieve dispersion; and when R6 is an alkyl group, alkyl alcohol, alkyl hydroxylamine, a fatty ester group, or an aromatic ester group, it can enhance the polarity of the substituent group G, generating strong interactions with the surface of the material, and maintaining certain distances between material particles, thereby further enhancing the dispersion effect of the dispersant.

In one embodiment, the phosphonic acid group and the derivative thereof have a chemical formula of

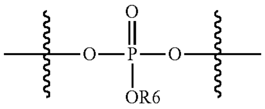
or
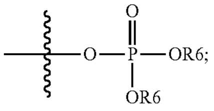

where R6 is selected from any one of H, an alkyl group, alkyl alcohol, alkyl hydroxylamine, a fatty ester group, and an aromatic ester group; where the alkyl group has a chemical formula of

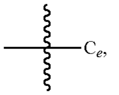

the alkyl alcohol has a chemical formula of

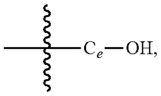

the alkyl hydroxylamine has a chemical formula of

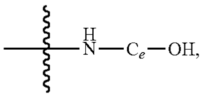

the fatty ester group has a chemical formula of

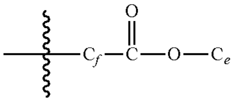
or
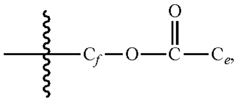

the aromatic ester group has a chemical formula of

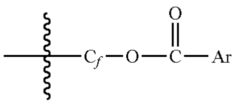
or
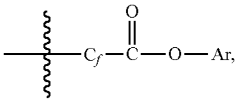

a value of e is in a range of 1-12, a value of f is in a range of 1-16, and carbon atoms in Ar have a quantity of not exceeding 12.

When R6 is H, the above group can ionize to release a negative ion, which then adsorbs onto a surface of the active material through positive and negative charge interactions, causing electrostatic repulsion between material particles to achieve dispersion; and when R6 is an alkyl group, alkyl alcohol, alkyl hydroxylamine, a fatty ester group, or an aromatic ester group, it can enhance the polarity of the substituent group G, generating strong interactions with the surface of the material, and maintaining certain distances between material particles, thereby further enhancing the dispersion effect of the dispersant.

In one embodiment, the dispersant includes a structure shown in formula (1) or a structure shown in formula (2):

(1)

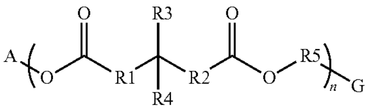
and (2)

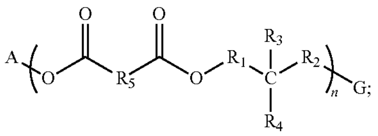

where a value of n is in a range of 3-100, and A is a capping group, where the capping group includes one or more of an alkoxy group

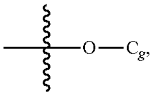

a phenylalkoxy group

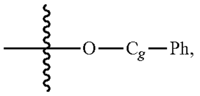

an ester group

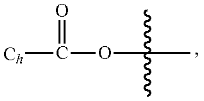

an ester group

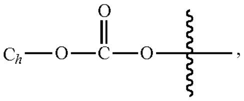

an amide group

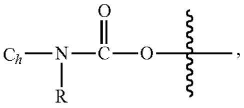

hydroxyl-OH, amino-$NH_2$, and carboxyl-COOH, a value of g is in a range of 1-12, $C_h$ is an alkyl segment or an aryl-containing segment, a value of h is in a range of 1-18, and R is H, a C1-C12 alkyl group, or a C6-C12 aryl group.

In this embodiment, the provided dispersant is selected to be a polymer with a polyester backbone, where the ester group in the polyester is a highly polar group that can produce strong polarization. Multiple closely spaced ester groups can combine to exert strong intermolecular forces on the surface of material particles, leading to adsorption, which forms a double electric layer structure on the particle surface and generates electrostatic repulsion. Additionally, an oxygen heteroatom in the ester group can also form a hydrogen bond with a less polar group on the particle surface. Furthermore, a solvated segment can be introduced into a side chain of the polyester to allow the side chain to fully extend in the solvent system, providing steric hindrance to enhance dispersal ability and subsequent stabilization, and preventing the particles from re-aggregating after being fully dispersed. Moreover, a carbon chain between two ester groups in the polyester compound molecule can freely rotate, providing a certain flexibility. When applied to an electrode plate, the polyester compound can embed into a rigid binder (such as PVDF) chain, increasing the sliding ability of the PVDF chain and enhancing the flexibility of the electrode plate.

In one embodiment, in the polyester compound, a weight percentage of a substituent group G segment is less than 15%, a weight percentage of solvated segments R1, R2, R3, R4, and R5 is less than 65%, and a weight percentage of a polyester group is 3%-30%. Through the controlling of the weight percentages of the groups in the polyester compound within the above range, good adsorption between the dispersant and the material particles, as well as between the dispersant and a dispersion medium can be achieved. This results in an improved dispersion effect while also ensuring that a polymer molecular chain has good flexibility.

In one embodiment, a weight-average molecular weight of the polyester compound is in a range of 500-100000. The molecular weight of the dispersant is relatively large, which can create a strong steric hindrance effect, allowing material particles to be fully dispersed and reducing the likelihood of re-agglomeration of the material particles.

In one embodiment, the weight-average molecular weight of the polyester compound is in a range of 2000-50000. The weight-average molecular weight of the dispersant being within the above range can further disperse material particles through physical isolation, while reducing re-agglomeration of the particles after dispersion.

To solve the above technical problem, another technical solution adopted in this application is: A positive electrode slurry is provided, including a positive electrode active material, a dispersant, and a solvent, where the dispersant includes a polyester compound, the polyester compound includes a structural unit A and/or a structural unit B, the structural unit A has a chemical formula of

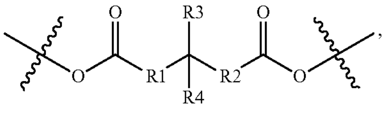, and the structural unit B has a chemical formula of

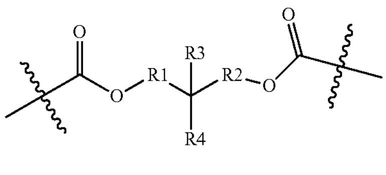;

where R1 and R2 are each selected from at least one of C0, a C1-C18 alkyl group, and a C6-C18 aryl group; and R3 and R4 are each selected from H, a C1-C18 alkyl group, a C6-C18 aryl group, and an ester group.

In this embodiment, the positive electrode slurry has good dispersion performance, which is beneficial for improving the uniformity and flexibility of the positive electrode plate.

In one embodiment, the dispersant accounts for 0.01%-3.0% of a total weight of the positive electrode slurry. With the dispersant within the above range of the total weight of the positive electrode slurry, a balance between the flexibility of the positive electrode plate and the energy density of the battery can be achieved.

In one embodiment, the dispersant accounts for 0.03%-2.0% of a total weight of the positive electrode slurry. With the dispersant within this range of the total weight of the positive electrode slurry, a balance between the flexibility of the positive electrode plate and the energy density of the battery can be further achieved.

In one embodiment, a viscosity of the positive electrode slurry is in a range of 4000 mPa·s-30000 mPa·s. With the viscosity of the positive electrode slurry within the above range, the slurry does not easily precipitate and has good dispersion performance, while also providing good leveling properties, which aids in coating.

In one embodiment, a solid content of the positive electrode slurry is in a range of 55%-65%. The above solid content is beneficial for improving the stability of the positive electrode slurry, and can also reduce the coating thickness and lower the internal resistance of the battery.

To solve the above technical problem, another technical solution adopted in this application is: A dispersant is provided, including a polyester compound, where the polyester compound includes a structural unit A and/or a structural unit B, the structural unit A has a chemical formula of

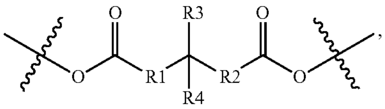, and the structural unit B has a chemical formula of

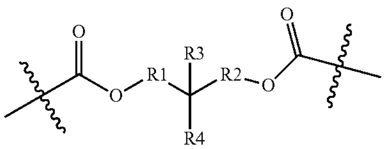;

where

R1 and R2 are each selected from at least one of C0, a C1-C18 alkyl group, and a C6-C18 aryl group; and R3 and R4 are each selected from H, a C1-C18 alkyl group, a C6-C18 aryl group, and an ester group.

In this embodiment, the dispersant can improve the dispersion performance of the positive electrode slurry, and enhance the uniformity and flexibility of the positive electrode plate, thereby providing the battery with high capacity and stability.

In one embodiment, the polyester compound includes a structural unit C and/or a structural unit D, the structural unit C has a chemical formula of

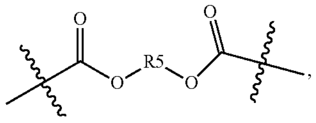

and the structural unit D has a chemical formula of

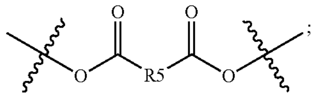

where R5 is selected from any one of a C1-C18 alkyl group and a C6-C18 aryl group. In this embodiment, the provided polyester compound may be formed by polycondensation of a polyacid with a diol, or by polycondensation of a polyol with a diacid, where a carbon chain between two ester groups in a polyester compound molecule can freely rotate, providing a certain flexibility. Through regulation of the carbon chain, the flexibility effect can be enhanced.

In one embodiment, the polyester compound further includes at least one substituent group G, and G includes any one of a carboxyl group and a derivative thereof, a sulfonic acid group and a derivative thereof, and a phosphonic acid group and a derivative thereof. The substituent group G can ionize to release a negative ion, which then adsorbs onto a surface of the active material through positive and negative charge interactions, causing electrostatic repulsion between material particles to achieve dispersion; alternatively, the substituent group G is a polar group that can generate strong interactions with the material surface, maintaining certain distances between material particles, thereby further enhancing the dispersion effect of the dispersant.

To solve the above technical problem, another technical solution adopted in this application is: Providing a preparation method of a dispersant, including the following steps: providing a polyacid monomer or a polyol monomer, where the polyacid monomer includes

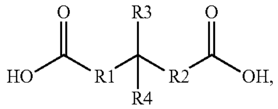

and the polyol monomer includes

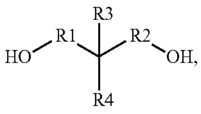

where R1 and R2 are each selected from at least one of C0, a C1-C18 alkyl group and a C6-C18 aryl group; and R3 and R4 are each selected from at least one of H, a C1-C18 alkyl group, a C6-C18 aryl group, and an ester group; and performing a polycondensation reaction of the polyacid monomer with a diol monomer to obtain the polyester compound according to any one of the above embodiments; or performing a polycondensation reaction of the polyol monomer with a diacid monomer to obtain the polyester compound according to any one of the above embodiments.

The dispersant prepared by the above method can improve the dispersion performance of the slurry, and when applied to an electrode plate, the flexibility of the positive electrode plate can be improved.

In one embodiment, after the polycondensation reaction, the method further includes: performing a reaction of the polyester compound with a halogen-substituted compound containing a substituent group G to obtain a polyester compound containing the substituent group G; where the substituent group G includes any one of a carboxyl group and a derivative thereof, a sulfonic acid group and a derivative thereof, and a phosphonic acid group and a derivative thereof. The substituent group G can ionize to release a negative ion, which then adsorbs onto a surface of the active material through positive and negative charge interactions, causing electrostatic repulsion between material particles to achieve dispersion; alternatively, the substituent group G is a polar group that can generate strong interactions with the material surface, maintaining certain distances between material particles, thereby further enhancing the dispersion effect of the dispersant.

In one embodiment, a molar feed ratio of the substituent group G to the polyacid monomer is 1:(1-100); and a molar feed ratio of the substituent group G to the polyol monomer is 1:(1-100). With the above settings, the prepared dispersant has better dispersion and flexibility enhancement effects.

To solve the above technical problem, another technical solution adopted in this application is: providing an electric device, including the above battery. The electric device has at least the same advantages as the battery, which can enhance the endurance of the electric device.

The foregoing description is merely an overview of the technical solution of this application. For a better understanding of the technical means in this application such that they can be implemented according to the content of the specification, and to make the above and other objectives, features, and advantages of this application more obvious and easier to understand, the following describes specific embodiments of this application.

BRIEF DESCRIPTION OF DRAWINGS

To describe the technical solutions in the embodiments of this application more clearly, the following briefly describes the accompanying drawings required for describing the embodiments. Apparently, the accompanying drawings in the following description show only some embodiments of this application, and persons of ordinary skill in the art may still derive other drawings from these accompanying drawings without creative efforts.

In the accompanying drawings.

Figure 1:
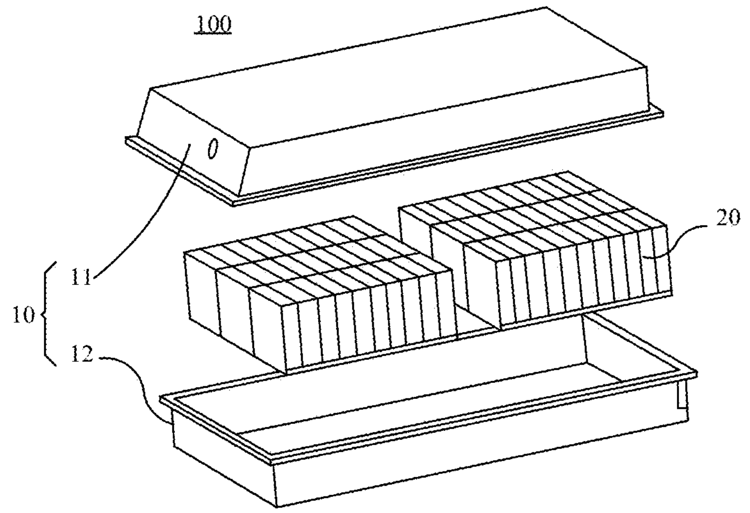
FIG. 1 is a schematic structural exploded view of a battery according to one or multiple embodiments of this application.

1000. vehicle; 300. motor; 200. controller; 100. battery; 10. box; 11. first portion; 12. second portion; 20. battery cell; 21. end cover; 21*a*. electrode terminal; 22. housing; and 23. electrode assembly.

DESCRIPTION OF EMBODIMENTS

To make the objectives, technical solutions, and effects of this application clearer and more explicit, the following describes the embodiments of the technical solutions of this application in detail with reference to the accompanying drawings. The following embodiments are merely intended for a clearer description of the technical solutions of this application and therefore are used as just examples which do not constitute any limitations on the protection scope of this application.

Unless otherwise defined, all technical and scientific terms used herein shall have the same meanings as commonly understood by those skilled in the art to which this application belongs. The terms used herein are merely intended to describe the specific embodiments but not intended to constitute any limitation on this application. The terms "include", "have", and any other variations thereof in the specification, the claims and the foregoing brief description of drawings of this application are intended to cover a non-exclusive inclusion.

In descriptions of embodiments of this application, the technical terms "first", "second" and the like are merely intended to distinguish between different objects, and shall not be understood as any indication or implication of relative importance or any implicit indication of the number, specific sequence or primary-secondary relationship of the technical features indicated. In the descriptions of the embodiments of this application, the term "a plurality of" means more than two (inclusive). Similarly, "a plurality of groups" means more than two (inclusive) groups, and "a plurality of pieces" means more than two (inclusive) pieces, unless otherwise specifically defined.

Reference to "embodiment" in the specification means that specific features, structures, or characteristics described with reference to the embodiment may be included in at least one embodiment of this application. The word "embodiment" appearing in various places in the specification does not necessarily refer to the same embodiment or an independent or alternative embodiment that is exclusive of other embodiments. Persons skilled in the art explicitly and implicitly understand that the embodiments described herein may combine with another embodiment.

In the description of the embodiments of this application, the term "and/or" is only an associative relationship for describing associated objects, indicating that three relationships may be present. For example, A and/or B may indicate the following three cases: presence of only A, presence of both A and B, and presence of only B. In addition, the character "/" in this specification generally indicates an "or" relationship between contextually associated objects.

Quantities, ratios, and other values are presented in the format of ranges in this specification. It should be understood that such range formats are used for convenience and simplicity and should be flexibly understood as including not only values clearly designated as falling within the range but also all individual values or sub-ranges covered by the range as if each value and sub-range are clearly designated.

Unless otherwise specified, all the steps in this application can be performed sequentially, randomly, or concurrently, and preferably, performed sequentially. For example, a method including steps (a) and (b) indicates that the method may include steps (a) and (b) performed sequentially, may include steps (b) and (a) performed sequentially, or may include steps (a) and (b) performed concurrently. For example, that the method may further include step (c) indicates that step (c) may be added to the method in any sequence. For example, the method may include steps (a), (b), and (c), or steps (a), (c), and (b), or steps (c), (a), and (b), or the like.

The lithium-ion battery, as a new type of green secondary battery, is widely used in electric vehicles, energy storage systems, and renewable energy fields. With the new development of lithium-ion batteries in China, various improvements in lithium-ion batteries are bound to be achieved.

Referring to FIG. 1, FIG. 1 is a schematic structural exploded view of a battery according to one or more embodiments. The battery 100 includes a box 10 and a battery cell 20, where the battery cell 20 is accommodated in the box 10. The box 10 is configured to provide an accommodating space for the battery cell 20. The box 10 may be a variety of structures. In some embodiments, the box 10 may include a first portion 11 and a second portion 12. The first portion 11 and the second portion 12 fit together such that the first portion 11 and the second portion 12 jointly define a space for accommodating the battery cell 20. The second portion 12 may be a hollow structure with one end open, and the first portion 11 may be a plate structure, where the first portion 11 covers the open side of the second portion 12 so that the first portion 11 and the second portion 12 jointly define the accommodating space. Alternatively, the first portion 11 and the second portion 12 may both be hollow structures with one side open, where the open side of the first portion 11 is engaged with the open side of the second portion 12. Certainly, the box 10 formed by the first portion 11 and the second portion 12 may be of a variety of shapes, for example, cylinder or cuboid.

In the battery 100, the battery cell 20 is present in plurality, and the plurality of battery cells 20 may be connected in series, parallel, or series-parallel, where being connected in series-parallel means a combination of series and parallel connections of the plurality of battery cells 20. The plurality of battery cells 20 may be directly connected in series, parallel, or series-parallel, and then an entirety of the plurality of battery cells 20 is accommodated in the box 10. Certainly, the battery 100 may alternatively be formed in a manner that a plurality of battery cells 20 are connected in series, parallel, or series-parallel first to form a battery module and then a plurality of battery modules are connected in series, parallel, or series-parallel to form an entirety which is accommodated in the box 10. The battery 100 may further include other structures. For example, the battery 100 may further includes a busbar configured to implement electrical connection between the plurality of battery cells 20.

Each battery cell 20 may be a secondary battery or a primary battery, and may be a lithium-sulfur battery, a sodium-ion battery, or a magnesium-ion battery, without being limited thereto. The battery cell 20 may be cylindrical, flat, cuboid, or of other shapes.

Figure 2:
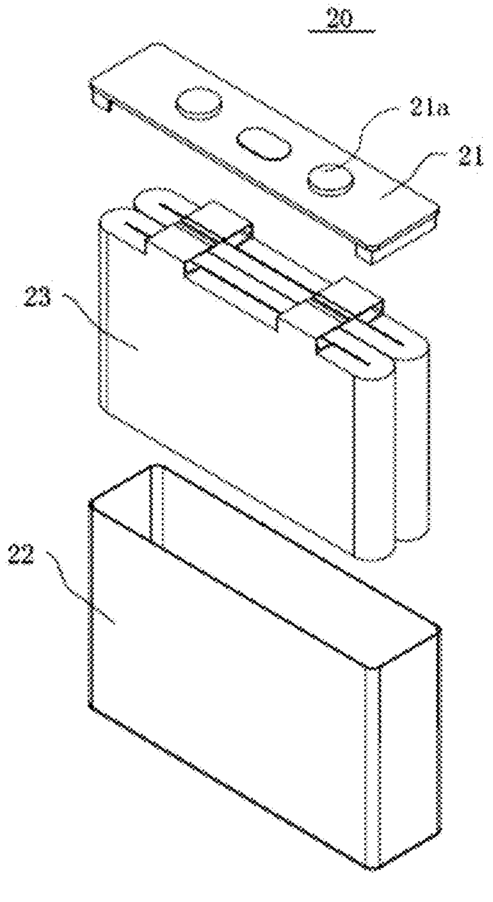
FIG. 2 is a schematic structural exploded view of a battery cell according to one or multiple embodiments of this application.

Referring to FIG. 2, FIG. 2 is a schematic structural exploded view of a battery cell according to one or more embodiments. The battery cell 20 refers to a smallest unit constituting a battery. As shown in FIG. 2, the battery cell 20 includes an end cover 21, a housing 22, an electrode assembly 23, and other functional components.

The end cover 21 refers to a component that covers an opening of the housing 22 to isolate an internal environment of the battery cell 20 from an external environment. A shape of the end cover 21 is not limited and may be adapted to a shape of the housing 22 to fit the housing 22. In some embodiments, the end cover 21 may be made of a material with given hardness and strength (for example, aluminum alloy), so that the end cover 21 is less likely to deform when subjected to extrusion and collision, allowing the battery cell 20 to have higher structural strength and enhanced safety performance. The end cover 21 may be provided with functional components such as an electrode terminal 21*a*. The electrode terminal 21*a* may be configured to be electrically connected to the electrode assembly 23 for outputting or inputting electrical energy of the battery cell 20. In some embodiments, the end cover 21 may further be provided with a pressure relief mechanism for releasing internal pressure when the internal pressure or a temperature of the battery cell 20 reaches a threshold. A material of the end cover 21 may also be diverse, including but not limited to copper, iron, aluminum, stainless steel, aluminum alloy, plastic, and the like. In some embodiments, an insulator may also be provided at an inner side of the end cover 21. The insulator may be configured to isolate an electrically connected component in the housing 22 from the end cover 21 to reduce the risk of short circuit. For example, the insulator may be made of plastic, rubber, or the like.

The housing 22 is an assembly configured to cooperate with the end cover 21 to form an internal environment of the battery cell 20, where the formed internal environment can be used to accommodate the electrode assembly 23, an electrolyte, and other components. The housing 22 and the end cover 21 may be independent components, and an opening may be provided in the housing 22, so that the end cover 21 can close the opening to form the internal environment of the battery cell 20. The end cover 21 and the housing 22 are not limited and may also be integrated. Specifically, the end cover 21 and the housing 22 may form a shared connection surface before other components are disposed inside the housing, and then the housing 22 is covered with the end cover 21 when inside of the housing 22 needs to be enclosed. The housing 22 may be of various shapes and sizes, for example, a rectangular shape, a cylindrical shape, and a hexagonal prism shape. Specifically, the shape of the housing 22 may be determined based on a specific shape and size of the electrode assembly 23. A material of the housing 22 may be diverse, including but not limited to copper, iron, aluminum, stainless steel, aluminum alloy, plastic, and the like.

The electrode assembly 23 is a component in which electrochemical reactions take place in the battery cell 20. The housing 22 may include one or more electrode assemblies 23. The electrode assembly 23 is mainly formed by winding or stacking a positive electrode plate and a negative electrode plate, and a separator is generally provided between the positive electrode plate and the negative electrode plate.

Portions of the positive electrode plate and the negative electrode plate with active substances constitute a body portion of the electrode assembly, while portions of the positive electrode plate and the negative electrode plate without active substances each constitute a tab. A positive electrode tab and a negative electrode tab may both be located at one end of the body portion or be located at two ends of the body portion respectively. During charge and discharge of the battery, a positive electrode active substance and a negative electrode active substance react with an electrolyte, and the tabs 23*a* are connected to the electrode terminals to form a current loop.

In some embodiments, the positive electrode plate includes a current collector and a positive electrode active layer disposed on the current collector.

The positive electrode active layer includes a positive active material, and the positive electrode active material may include at least one of the following materials: olivine-structured lithium-containing phosphate, lithium transition metal oxide, and respective modified compounds thereof. However, this application is not limited to such materials, and may alternatively use other conventional materials that can be used as positive electrode active materials for batteries instead. One of these positive electrode active materials may be used alone, or two or more of them may be used in combination. Examples of the lithium transition metal oxide may include but are not limited to at least one of lithium cobalt oxide (for example, $LiCoO_2$), lithium nickel oxide (for example, $LiNiO_2$), lithium manganese oxide (for example, $LiMnO_2$ and $LiMn_2O_4$), lithium nickel cobalt oxide, lithium manganese cobalt oxide, lithium nickel manganese oxide, lithium nickel cobalt manganese oxide (for example, $LiNi_{1/3}Co_{1/3}Mn_{1/3}O_2$ (NCM333 for short), $LiNi_{0.5}Co_{0.2}Mn_{0.3}O_2$ (NCM523 for short), $LiNi_{0.5}Co_{0.25}Mn_{0.25}O_2$ (NCM211 for short), $LiNi_{0.6}Co_{0.2}Mn_{0.2}O_2$ (NCM622 for short), and $LiNi_{0.8}Co_{0.1}Mn_{0.1}O_2$ (NCM811 for short)), lithium nickel cobalt aluminum oxide (for example, $LiNi_{0.85}Co_{0.15}Al_{0.05}O_2$), and modified compounds thereof. Examples of the olivine-structured lithium-containing phosphate may include but are not limited to at least one of lithium iron phosphate (for example, $LiFePO_4$ (LFP for short)), composite material of lithium iron phosphate and carbon, lithium manganese phosphate (for example, $LiMnPO_4$), composite material of lithium manganese phosphate and carbon, lithium manganese iron phosphate, or composite material of lithium manganese iron phosphate and carbon.

In one embodiment, the positive electrode active material includes lithium manganese iron phosphate ($LiFe_xMn_{1-x}PO_4$), lithium cobalt oxide ($LiCoO_2$), lithium manganese oxide ($LiMn_2O_4$), lithium iron phosphate ($LiFePO_4$), and a high-nickel layered material $Li_{1+y}(Ni_aCo_bMn_{1-a-b-c}B_c)_{1-y}O_2$; where $0 \le y \le 0.05$, $0.85 \le a \le 0.95$, $0.01 \le b \le 0.10$, $0 \le c \le 0.05$, and B is one or more of $Zn^{2+}$, $Mg^{2+}$, $Al^{3+}$, $Cr^{3+}$, $Sc^{3+}$, $Ga^{3+}$, $La^{3+}$, $Sm^{3+}$, $Ti^{4+}$, $Zr^{4+}$, $Nb^{5+}$, and $W^{6+}$.

In one embodiment, the active layer of the positive electrode material further includes a conductive agent and a binder; the conductive agent includes one or more of conductive carbon black, conductive graphite, carbon fiber, carbon nanotubes, graphene, Ketjen black, and acetylene black; and the binder includes one or more of polyvinylidene fluoride, polytetrafluoroethylene, acrylate, and polyurethane.

The conductive agent imparts conductivity to the electrode. The positive electrode conductive material may include any conductive material that causes no chemical change. The positive electrode conductive material includes but is not limited to a carbon-based material (for example, natural graphite, artificial graphite, carbon black, acetylene black, Ketjen black, and carbon fiber), a metal-based material (for example, metal powder and metal fiber, including copper, nickel, aluminum, and silver), a conductive polymer (for example, a polyphenylene derivative), and a mixture thereof. In one embodiment, the conductive agent includes one or more of conductive carbon black, conductive graphite, carbon fiber, carbon nanotubes, graphene, Ketjen black, and acetylene black.

The binder enhances the adhesion stability of the active layer, reducing the likelihood of powder shedding. The binder may be one or more of styrene-butadiene rubber (SBR), water-based acrylic resin (water-based acrylic resin), poly(vinylidene difluoride) (PVDF), polytetrafluoroethylene (PTFE), ethylene-vinyl acetate copolymer (EVA), polyacrylic acid (PAA), carboxymethyl cellulose (CMC), polyvinyl alcohol (PVA), and polyvinyl butyral (PVB). In one embodiment, the binder includes one or more of polyvinylidene fluoride, polytetrafluoroethylene, acrylate, and polyurethane.

In one embodiment, the active layer of the positive electrode material further includes the dispersant according to any one of the foregoing embodiments, or a dispersant prepared using the preparation method of the dispersant according to any one of the foregoing embodiments. The dispersant is beneficial for improving the uniformity and flexibility of the positive electrode plate.

In some embodiments, the negative electrode plate includes a current collector and a negative electrode active layer disposed on the current collector.

The negative electrode active layer includes a negative electrode active material, and the negative electrode active material includes, but is not limited to, a carbon-based negative electrode material, a silicon-based negative electrode material, a tin-based negative electrode material, a lithium titanate negative electrode material, a metallic lithium negative electrode material, and the like; specifically includes, but not limited to, a graphite material, a silicon-carbon material, a graphite-silicon suboxide material, a nanosilicon material, a silicon suboxide material, and a tin-based material; more specifically includes one or more of natural graphite, artificial graphite, mesocarbon microbeads (abbreviated as MCMB), hard carbon, soft carbon, silicon, a silicon-carbon composite, a Li—Sn alloy, a Li—Sn—O alloy, Sn, SnO, $SnO_2$, lithiated $TiO_2$—$Li_4T_{15}O_{12}$, with a spinel structure, and a Li—Al alloy.

In some embodiments, the negative electrode active layer may further include a binder, a conductive agent, and another optional additive. As an example, the conductive agent may be one or more of superconducting carbon, acetylene black, carbon black, Ketjen black, carbon dot, carbon nanotubes, Super P (SP), graphene, and carbon nanofiber. In an example, the binder may be one or more of styrene-butadiene rubber (SBR), water-based acrylic resin (water-based acrylic resin), poly(vinylidene difluoride) (PVDF), polytetrafluoroethylene (PTFE), ethylene-vinyl acetate copolymer (EVA), polyacrylic acid (PAA), carboxymethyl cellulose (CMC), polyvinyl alcohol (PVA), and polyvinyl butyral (PVB). In an example, the other optional additive may be a thickening and dispersant (such as sodium carboxymethyl cellulose CMC-Na) and a PTC thermistor material.

In some embodiments, a material of the separator may be at least one selected from glass fiber, non-woven fabric, polyethylene, polypropylene, and poly(vinylidene difluoride). The separator may be a single-layer film or a multi-layer composite film, and is not particularly limited. When the separator is a multi-layer composite film, all layers may be made of same or different materials, which is not particularly limited.

In one embodiment, the electrolyte includes one or more of a carbonate solvent and an ether solvent.

The carbonate is typically small-molecule cyclic or chain carbonate; including, but not limited to, one or more of ethylene carbonate, propylene carbonate, butylene carbonate, vinylene carbonate, methyl propyl carbonate, dipropyl carbonate, dimethyl carbonate, diethyl carbonate, ethyl methyl carbonate, and fluorocarboxylate; and the carbonate may also include at least one ester solvent from γ-butyrolactone, dimethyl sulfite, ethyl acetate, methyl acetate, methyl butyrate, ethyl butyrate, methyl propionate, ethyl propionate, propyl acetate, and fluorocarboxylate.

The ether solvent includes, but is not limited to, one or more of dimethyl ether, diethyl ether, tetrahydrofuran, methyltetrahydrofuran, ethylene oxide, 1,3-dioxolane, fluorinated ether, DME (ethylene glycol dimethyl ether), DEE (ethylene glycol diethyl ether), DEGDME (diethylene glycol dimethyl ether), TRGDME (triethylene glycol dimethyl ether), TEGDME (tetraethylene glycol dimethyl ether), dipropyl ether, and dibutyl ether.

In other embodiments, the electrolyte may further include a mixture composed of any one or more of an amine solvent, a sulfone solvent, and a nitrile solvent. The amine solvent includes at least one of N-methylacetamide, N-methylformamide, dimethylformamide, and diethylformamide. The sulfone solvent includes at least one of dimethyl sulfoxide, sulfolane, diphenyl sulfoxide, thionyl chloride, and dipropyl sulfone. The nitrile solvent includes at least one of acetonitrile, succinonitrile, adiponitrile, and glutaronitrile. The electrolyte is preferably a high-voltage-resistant electrolyte, which exhibits reduced acidity under high voltage, facilitates the transport of an active ion, significantly reducing a side reaction on the electrode surface, and improving the battery stability.

In some embodiments, the electrolyte further includes an electrolytic salt, where the electrolytic salt may be at least one selected from lithium hexafluorophosphate, lithium tetrafluoroborate, lithium perchlorate, lithium hexafluoroborate, lithium bis(fluorosulfonyl)imide, lithium bis-trifluoromethanesulfonimide, lithium trifluoromethanesulfonate, lithium difluorophosphate, lithium difluoroxalate borate, lithium bisoxalatoborate, lithium difluorobisoxalate phosphate, and lithium tetrafluoro oxalate phosphate.

In some embodiments, the electrolyte further optionally includes an additive. For example, the additive may include a negative electrode film-forming additive, or may include a positive electrode film-forming additive, or may include an additive that can improve some performance of the battery, for example, an additive for improving over-charge performance of the battery, an additive for improving high-temperature performance of the battery, and an additive for improving low-temperature performance of the battery.

As mentioned earlier, the electrode assembly is a component in which electrochemical reactions take place in the battery cell. The electrode assembly is mainly formed by winding or stacking a positive electrode plate and a negative electrode plate, and a separator is typically disposed between the positive electrode plate and the negative electrode plate. The positive electrode plate includes a current collector and a positive electrode active layer provided on the current collector. The positive electrode active layer includes a positive electrode active material, a conductive agent, a binder, and the like. In the preparation process of the positive electrode plate, the positive electrode active material, conductive agent, and binder are first thoroughly stirred and mixed in a solvent to achieve uniformity to prepare a positive electrode slurry; and then the positive electrode slurry is applied on the current collector, dried, and cold-pressed to obtain the positive electrode plate.

Therefore, the properties of the positive electrode slurry significantly affect the performance of the positive electrode plate. In the positive electrode slurry, a solid content affects the stability of the slurry. Within a certain range, a higher solid content of the slurry will lead to a greater stability of the slurry. Moreover, a slurry with a high solid content can reduce the thickness of the coating layer and lower an internal resistance of a battery. However, a slurry with a high solid content lacks sufficient dispersion performance and is prone to a gelation phenomenon, which reduces the uniformity of the positive electrode plate, leading to capacity loss of the battery.

Furthermore, increasing a coating thickness of the positive electrode slurry and a compacted density of the positive electrode plate helps to enhance an energy density of the battery. However, when the coating thickness is large and the compacted density is high, the flexibility of the positive electrode plate decreases, resulting in reduced stability and susceptibility to cracking of the positive electrode plate.

Accordingly, this application provides a dispersant. The use of the dispersant can improve the dispersion performance of the positive electrode slurry, enhance the uniformity and the flexibility of the positive electrode plate, and enable the battery to achieve a higher capacity and stability. The dispersant can be applied to the positive electrode plate of the battery. In other words: This application provides a battery, where the battery includes a positive electrode plate, where the positive electrode plate includes a current collector and a positive electrode material layer provided on at least one side of the current collector, the positive electrode material layer includes a positive electrode active material and a dispersant, the dispersant includes a polyester compound, the polyester compound includes a structural unit A or a structural unit B, the structural unit A has a chemical formula of

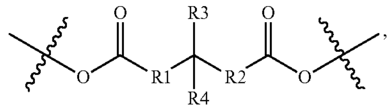
, and the structural unit B has a chemical formula of

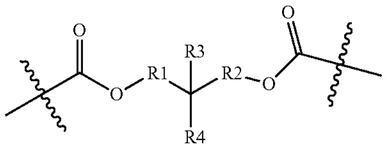
;

where R1 and R2 are each selected from at least one of C0, a C1-C18 alkyl group, and a C6-C18 aryl group; and R3 and R4 are each selected from H, a C1-C18 alkyl group, a C6-C18 aryl group, and an ester group.

C0 refers to a group containing 0 carbon atoms, meaning that the ester groups at two ends are directly connected to a middle carbon atom; C1-C18 alkyl group refers to an alkyl chain containing 1 to 18 carbon atoms; and C6-C18 aryl group refers to an aryl chain containing 6 to 18 carbon atoms.

In this embodiment, the provided dispersant is selected to be a polymer with a polyester backbone, where the ester group in the polyester is a highly polar group that can produce strong polarization. Multiple closely spaced ester groups can combine to exert strong intermolecular forces on the surface of material particles, leading to adsorption, which forms a double electric layer structure on the particle surface and generates electrostatic repulsion. Additionally, an oxygen heteroatom in the ester group can also form a hydrogen bond with a less polar group on the particle surface. Furthermore, a solvated segment can be introduced into a side chain of the polyester to allow the side chain to fully extend in the solvent system, providing steric hindrance to enhance dispersal ability and subsequent stabilization, and preventing the particles from re-aggregating after being fully dispersed. Moreover, a carbon chain between two ester groups in the polyester compound molecule can freely rotate, providing a certain flexibility to the dispersant. When applied to an electrode plate, the polyester compound can embed into a rigid binder (such as PVDF) chain, increasing the sliding ability of the PVDF chain and enhancing the flexibility of the electrode plate. The positive electrode plate of such a battery exhibits good uniformity and flexibility and is not prone to cracking, resulting in a high capacity and stability of the battery. In addition, without compromising the structural stability of the positive electrode plate, the coating thickness and the compacted density of the positive electrode plate can be increased, thereby enhancing the energy density of the battery.

The polyester is a polymer obtained through polycondensation of a polyol with a polyacid. In this embodiment, the provided polyester compound may be formed through polycondensation of a polyacid with a diol, or through polycondensation of a polyol with a diacid.

Specifically, a polyacid monomer may be selected to undergo a polycondensation reaction with a diol to obtain the polyester compound. For example, a diacid monomer

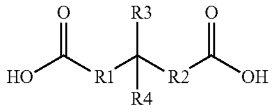

may be selected to prepare the polyester compound, forming a structural unit A

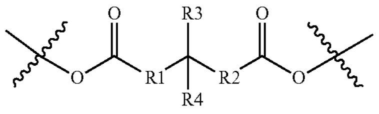

in the polyester compound. Alternatively, a polyol monomer may be selected to undergo a polycondensation reaction with a diacid to obtain the polyester compound. For example, a diol monomer

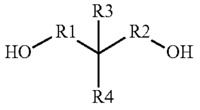

may be selected to prepare the polyester compound, forming a structural unit B

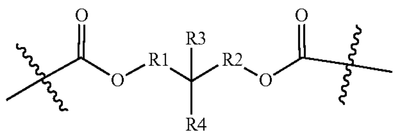

in the polyester compound. It can be that a polyester compound contains only structural unit A, or only structural unit B, or a same polyester compound contains both structural units A and B.

In one embodiment, R1 and R2 are each selected from at least one of C0, a C1-C18 alkyl group, and a C6-C18 aryl group. R1 and R2 are located on a backbone of the polyester compound and are provided between two ester groups. With the above carbon chain structure selected, a carbon chain between the two ester groups in a molecule of the polyester compound can freely rotate, providing the dispersant with a certain flexibility. Through regulation of the carbon chain, the flexibility effect can be enhanced.

In one embodiment, R3 and R4 are each selected from at least one of H, a C1-C18 alkyl group, a C6-C18 aryl group, and an ester group. R3 and R4 are side chain groups of the polyester compound and can be introduced into the polyester compound as a solvated segment. The solvated segment dissolves well in a dispersion medium (typically an organic solvent, such as N-methylpyrrolidone), allowing the solvated segment to fully extend in the dispersion medium system, providing a steric hindrance effect to enhance the dispersion capability and subsequent stabilization, and preventing the particles from re-aggregating after being fully dispersed.

In one embodiment, the ester group has a chemical formula of

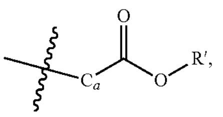

where 0≤a≤6, and R' is selected from any one of a C1-C18 alkyl group, a C6-C18 aryl group, a polyoxyethylene ether segment, and a polyoxyethylene ether polyoxypropylene ether copolymer segment.

$C_a$ refers to a carbon chain structure with a carbon atoms, and may be an alkyl chain structure. The number of carbon atoms is in a range of 0-6. When the number of carbon atoms is 0, the ester group is directly connected to the backbone of the polyester compound.

In this embodiment, a carbon chain or polyether segment is introduced into R3 and R4 to serve as a solvated segment to fully extend in a solvent system. This creates a steric hindrance effect to enhance dispersion capability and subsequent stabilization, preventing the particles from re-aggregating after being fully dispersed.

In one embodiment, the polyoxyethylene ether polyoxypropylene ether copolymer segment includes

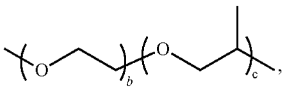

where 3≤b≤60 and 0≤c≤60. The polyoxyethylene ether polyoxypropylene ether copolymer segment can serve as a solvated segment, with a degree of polymerization within the above range, providing a good solvation effect and enhancing dispersion performance.

In one embodiment, the polyester compound includes a structural unit C or a structural unit D, the structural unit C has a chemical formula of

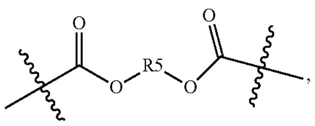

and the structural unit D has a chemical formula of

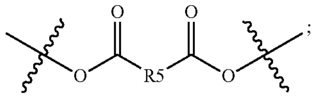

where R5 is selected from any one of a C1-C18 alkyl group and a C6-C18 aryl group.

As described earlier, a polyacid monomer can be selected to undergo a polycondensation reaction with a diol to obtain the polyester compound. Alternatively, a polyol monomer may be selected to undergo a polycondensation reaction with a diacid to obtain the polyester compound. For example, a diacid monomer

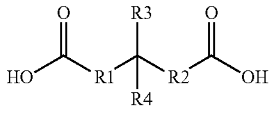

may be selected to prepare the polyester compound, and the diol reacting with the diacid monomer

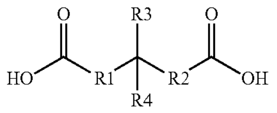

may be

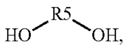

forming a structural unit C in the polyester compound:

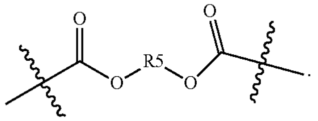

Alternatively, a diol monomer

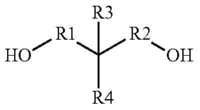

may be selected to prepare the polyester compound, and the diacid reacting with the diol monomer

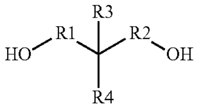

may be

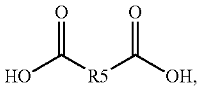

forming a structural unit D in the polyester compound:

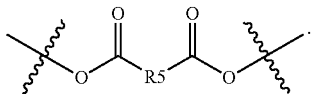

In this embodiment, R5, as a carbon chain between two ester groups in the polyester compound molecule, can freely rotate, providing the dispersant with a certain flexibility. Through regulation of the carbon chain, the flexibility effect can be enhanced.

In one embodiment, the polyester compound further includes at least one substituent group G, and G includes any one of a carboxyl group and a derivative thereof, a sulfonic acid group and a derivative thereof, and a phosphonic acid group and a derivative thereof.

The substituent group G can ionize to release a negative ion, which then adsorbs onto a surface of a polar material through positive and negative charge interactions, causing electrostatic repulsion between material particles to achieve dispersion. Alternatively, the substituent group G is a polar group that can generate strong interactions with the material surface, maintaining certain distances between material particles, thereby further enhancing the dispersion effect of the dispersant.

In some embodiments, the substituent group G is any one of a carboxyl group, a sulfonic acid group, and a phosphonic acid group. At this time, the substituent group G can ionize to produce a negative ion, and different substituent groups G produce different negative ions. Through the controlling of a type of the substituent group G, different types of negative ions can be ionized, resulting in varying interaction forces, thereby achieving an adsorption effect on surfaces of materials with different polarities through positive and negative charge interactions, and causing electrostatic repulsion between material particles to achieve the dispersion purpose.

In some embodiments, the substituent group G is any one of a carboxyl group derivative, a sulfonic acid group derivative, and a phosphonic acid group derivative. A derivative of a corresponding group is obtained when an active hydrogen on a carboxyl group, a sulfonic acid group, or a phosphonic acid group is replaced by another substituent. At this time, the substituent group G, as a polar group, can produce a strong interaction force with the material surface, maintaining certain distances between material particles, thereby enhancing the dispersion effect of the dispersant.

In one embodiment, the substituent group G may further include a cationic group or an aromatic non-polar group. The cationic group can produce an electrostatic interaction with a material containing a negative charge, causing electrostatic repulsion between material particles to achieve the dispersion purpose. The aromatic non-polar group exhibits an excellent adsorption effect on a carbon-coated material, enabling particles of such a material to maintain certain distances, thereby further enhancing the dispersion effect of the dispersant.

In one embodiment, the carboxyl group and the derivative thereof have a chemical formula of

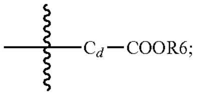

and/or the sulfonic acid group and the derivative thereof have a chemical formula of

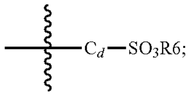

where a value of d ranges from greater than 1 and less than or equal to 12, and R6 is selected from any one of H, an alkyl group, alkyl alcohol, alkyl hydroxylamine, a fatty ester group, and an aromatic ester group; where the alkyl group has a chemical formula of

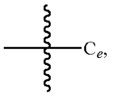

the alkyl alcohol has a chemical formula of

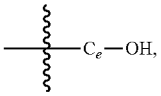

the alkyl hydroxylamine has a chemical formula of

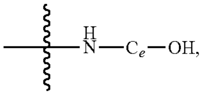

the fatty ester group has a chemical formula of

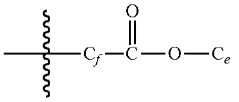 or 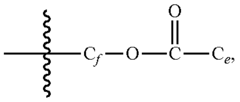

the aromatic ester group has a chemical formula of

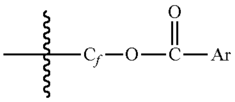 or 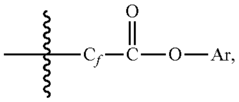

a value of e is in a range of 1-12, a value of f is in a range of 1-16, and carbon atoms in Ar have a quantity of not exceeding 12.

In this embodiment, $C_d$ represents a carbon chain with d carbon atoms, which can be an alkyl chain. It can act as a solvated segment to provide solvation effects. When R6 is H, the above group can ionize to release a negative ion, which then adsorbs onto a surface of the material through positive and negative charge interactions, causing electrostatic repulsion between material particles to achieve dispersion; and when R6 is an alkyl group, alkyl alcohol, alkyl hydroxylamine, a fatty ester group, or an aromatic ester group, it can enhance the polarity of the substituent group G, generating strong interactions with the surface of the material, and maintaining certain distances between material particles, thereby further enhancing the dispersion effect of the dispersant.

In one embodiment, a phosphonic acid group and a derivative thereof include a bis-ester phosphonic acid and a derivative thereof or a mono-ester phosphonic acid and a derivative thereof; the bis-ester phosphonic acid and the derivative thereof have a chemical formula of

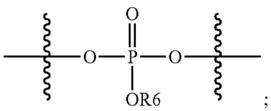
;

and the mono-ester phosphonic acid and the derivative thereof have a chemical formula of

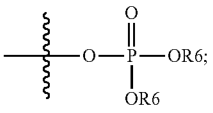

where R6 is selected from any one of H, an alkyl group, alkyl alcohol, alkyl hydroxylamine, a fatty ester group, and an aromatic ester group; where the alkyl group has a chemical formula of

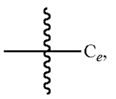

the alkyl alcohol has a chemical formula of

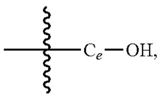

the alkyl hydroxylamine has a chemical formula of

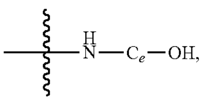

the fatty ester group has a chemical formula of

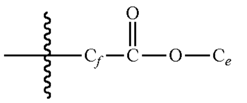
or
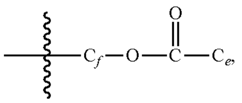

the aromatic ester group has a chemical formula of

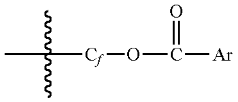
or
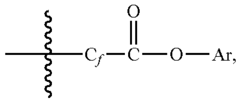

a value of e is in a range of 1-12, a value of f is in a range of 1-16, and carbon atoms in Ar have a quantity of not exceeding 12.

When R6 is H, the above group can ionize to release a negative ion, which then adsorbs onto a surface of the material through positive and negative charge interactions, causing electrostatic repulsion between material particles to achieve dispersion; and when R6 is an alkyl group, alkyl alcohol, alkyl hydroxylamine, a fatty ester group, or an aromatic ester group, it can enhance the polarity of the substituent group G, generating strong interactions with the surface of the material, and maintaining certain distances between material particles, thereby further enhancing the dispersion effect of the dispersant.

In one embodiment, two sides of a bis-ester phosphonic acid and a derivative thereof are symmetric polyester segments.

The substituent group G, as an anchoring group, can adsorb onto the surfaces of material particles through an ionic bond, a hydrogen bond, a van der Waals force, and the like, maintaining certain distances between material particles, thereby further enhancing the dispersion effect of the dispersant.

In one embodiment, G is a terminal group of the polyester compound. Through this arrangement, the dispersant can better interact with the material, enhancing the dispersion effect.

The terminal group (terminal group) refers to a group at an end of a polymer molecular chain. A substituent group G is connected to an end of a backbone of the polyester compound. Thus, a polyester compound molecule has at most 2 Gs, preferably a polyester compound molecule has 1 G. When the substituent group G is a bis-ester phosphonic acid or a derivative thereof, two ends of G are connected to symmetric polyester segments.

In an embodiment, it can be that a polyester segment is first prepared, and then the substituent group G is introduced at an end of the polyester segment.

In one embodiment, the dispersant includes a structure shown in formula (1) or a structure shown in formula (2):

(1)

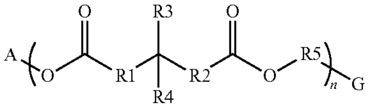
and (2)

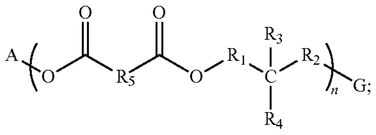

where a value of n is in a range of 3-100, and A is a capping group, where the capping group includes one or more of an alkoxy group

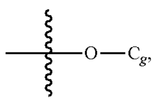

a phenylalkoxy group

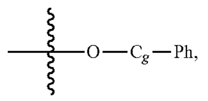

an ester group

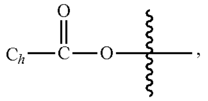

an ester group

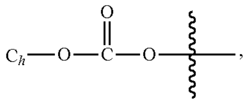

an amide group

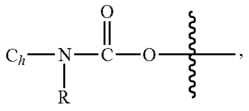

hydroxyl-OH, amino-$NH_2$, and carboxyl-COOH, a value of g is in a range of 1-12, $C_h$ is an alkyl segment or an aryl-containing segment, a value of h is in a range of 1-18, and R is H, a C1-C12 alkyl group, or a C6-C12 aryl group.

The selection of the capping group depends on whether a final group is a hydroxyl (alcohol-terminated) or a carboxyl (acid-terminated). For example, if the final group is a hydroxyl (alcohol-terminated), the final group may be

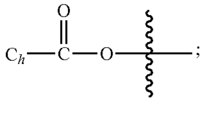

and if the final group is a carboxyl (acid-terminated), the final group may be

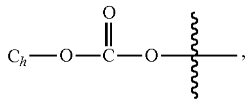

or the final group may also be

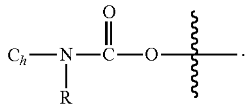

In this embodiment, the provided dispersant is selected to be a polymer with a polyester backbone, where the ester group in the polyester is a highly polar group that can produce strong polarization. Multiple closely spaced ester groups can combine to exert strong intermolecular forces on the surface of material particles, leading to adsorption, which forms a double electric layer structure on the particle surface and generates electrostatic repulsion. Additionally, an oxygen heteroatom in the ester group can also form a hydrogen bond with a less polar group on the particle surface. Furthermore, a solvated segment can be introduced into a side chain of the polyester to allow the side chain to fully extend in the solvent system, providing steric hindrance to enhance dispersal ability and subsequent stabilization, and preventing the particles from re-aggregating after being fully dispersed. Moreover, a carbon chain between two ester groups in the polyester compound molecule can freely rotate, providing a certain flexibility. When applied to an electrode plate, the polyester compound can embed into a rigid binder (such as PVDF) chain, increasing the sliding ability of the PVDF chain and enhancing the flexibility of the electrode plate.

In one embodiment, in the polyester compound, a weight percentage of a substituent group G segment is less than 15%, a weight percentage of solvated segments R1, R2, R3, R4, and R5 is less than 65%, and a weight percentage of a polyester group is 3%-30%. Through the controlling of the weight percentages of the groups in the polyester compound within the above range, good adsorption between the dispersant and the material particles, as well as between the dispersant and a dispersion medium can be achieved. This results in an improved dispersion effect while also ensuring that a polymer molecular chain has good flexibility.

In one embodiment, the weight-average molecular weight of the polyester compound is in a range of 500-100000. For example, the weight-average molecular weight of the polyester compound may be 500, 3000, 10000, 25000, 30000, 40000, 60000, 80000, 100000, and the like, or a range composed of any two of the above values, such as 10000-30000, 25000-50000, 70000-85000, 90000-100000, and the like. The molecular weight of the dispersant is relatively large, which can create a strong steric hindrance effect, allowing material particles to be fully dispersed and reducing the likelihood of re-agglomeration of the material particles.

In one embodiment, the weight-average molecular weight of the polyester compound is in a range of 2000-50000. For example, the weight-average molecular weight of the polyester compound may be 2000, 3000, 8000, 10000, 25000, 30000, 40000, 50000, and the like, or in a range composed of any two of the above values, such as 2000-5000, 5000-15000, 15000-35000, 35000-50000, and the like. The weight-average molecular weight of the dispersant being within the above range can further disperse material particles through physical isolation, while reducing re-agglomeration of the particles after dispersion.

The dispersant with the above structure can achieve good dispersion of the positive electrode material. When applied to the positive electrode plate, the dispersant can improve the stability and the flexibility of the positive electrode plate, thereby reducing the capacity loss of the battery.

In one embodiment, the positive electrode active material includes one or more of lithium iron phosphate and lithium manganese iron phosphate. The above positive electrode active material can interact with the dispersant in the positive electrode material layer, maintaining certain distances between positive electrode active material particles, with a good dispersion effect.

In one embodiment, a sheet resistance of the positive electrode plate is in a range of 0.05Ω-0.30Ω. The sheet resistance of the positive electrode plate may be 0.05 Ω, 0.10 Ω, 0.135 Ω, 0.15Ω, 0.20Ω, 0.25Ω, 0.30Ω, and the like; or in a range composed of any two of the above values, such as 0.05Ω-0.10 Ω, 0.135Ω-0.20Ω, 0.20Ω-0.30Ω, and the like. The sheet resistance of the positive electrode plate is small, which helps to reduce an internal resistance of the battery.

This application further provides a preparation method of a dispersant, including the following steps: providing a polyacid monomer or a polyol monomer, where the polyacid monomer includes

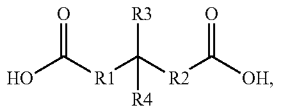

and the polyol monomer includes

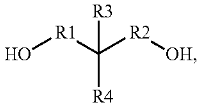

where R1 and R2 are each selected from at least one of C0, a C1-C18 alkyl group and a C6-C18 aryl group; and R3 and R4 are each selected from at least one of H, a C1-C18 alkyl group, a C6-C18 aryl group, and an ester group; and performing a polycondensation reaction of the polyacid monomer with a diol monomer to obtain the polyester compound according to any one of the above embodiments; or performing a polycondensation reaction of the polyol monomer with a diacid monomer to obtain the polyester compound according to any one of the above embodiments. The dispersant prepared by the above method can improve the dispersion performance of the slurry, and when applied to an electrode plate, the flexibility of the positive electrode plate can be improved.

In one embodiment, after the polycondensation reaction, the method further includes: performing a reaction of the polyester compound with a halogen-substituted compound containing a substituent group G to obtain a polyester compound containing the substituent group G; where the substituent group G includes any one of a carboxyl group and a derivative thereof, a sulfonic acid group and a derivative thereof, and a phosphonic acid group and a derivative thereof. The substituent group G can ionize to release a negative ion, which then adsorbs onto a surface of a polar material through positive and negative charge interactions, causing electrostatic repulsion between material particles to achieve dispersion; alternatively, the substituent group G is a polar group that can generate strong interactions with the material surface, maintaining certain distances between material particles, thereby further enhancing the dispersion effect of the dispersant.

In one embodiment, a molar feed ratio of the substituent group G to the polyacid monomer is 1:(1-100); and a molar feed ratio of the substituent group G to the polyol monomer is 1:(1-100). Through the controlling of the weight percentages of the groups in the polyester compound within the above range, good adsorption between the dispersant and the material particles, as well as between the dispersant and a dispersion medium can be achieved. This results in an improved dispersion effect while also ensuring that a polymer molecular chain has good flexibility.

In one application scenario, the dispersant provided in this application can serve as an additive in an electrode material slurry. For example, the dispersant can be applied to a positive electrode slurry of a lithium-ion battery.

Taking the active material being lithium iron phosphate (LFP) as an example, in a positive electrode slurry of an existing lithium-ion battery, the dispersion performance of the slurry at a high solid content is insufficient, easily causing gelation. With the production process of lithium iron phosphate (LFP) continues to develop and the demand for increasing energy density rises, the particle size of LFP continues to decrease, the specific surface area continues to increase, and the surface energy becomes higher, making it difficult for particles to disperse. Furthermore, under thick coating and a high compacted density, the flexibility of an electrode plate becomes poor, leading to an issue of cracking in the electrode plate.

In view of this, a dispersant in this application is applied to the lithium iron phosphate (LFP) positive electrode slurry of a lithium-ion battery. An ester group in a polyester primarily exerts a strong adsorption effect on particles in the system through a hydrogen bond interaction, a coordination interaction, or a strong intermolecular force. In addition, a long chain on a side chain serves as a solvated segment, providing a steric hindrance effect to stabilize dispersed particles. A polar anchoring group G is further introduced into the structure of a branched polyester dispersant, enhancing the adsorption effect more significantly, and improving the dispersion performance.

In this embodiment, the dispersion mechanism of the dispersant is as follows: for a polar surface of the LFP powder, a branched polymer capable of multi-site adsorption is designed. G, as a polar anchoring group, acts on the polar surfaces of LFP particles. In addition, the backbone is primarily a polyester, where the ester group in the polyester is a highly polar group that can produce strong polarization. Multiple closely spaced ester groups can combine to exert strong intermolecular forces on surfaces of particles, leading to adsorption, which forms a double electric layer structure on the particle surface and generates electrostatic repulsion. In addition, an oxygen heteroatom on the ester group can also form a hydrogen bond interaction with a residual group on a weak polar carbon coating on the LFP particle surfaces. Furthermore, a carbon chain or a polyether segment is introduced onto a polyester side chain to serve as a solvated segment that fully extends in an NMP system, providing a steric hindrance effect to enhance dispersion ability and subsequent stabilization, and preventing particles from re-aggregating after being fully dispersed.

The flexibilization mechanism of the dispersant is as follows: a carbon chain between two ester groups can freely rotate, providing a certain flexibility; additionally, a carbon chain or a polyether segment on a side chain, as a good flexible group, can embed into a PVDF chain, increasing the sliding ability of the PVDF chain, and enhancing the flexibility of an electrode plate.

In view of this, for the polyester compound dispersant provided in this application, an anchoring group and a polar group are introduced into the molecule, enhancing the adsorption effect between the polymer and particle surfaces of varying polarities, improving the dispersion performance. At the same time, a solvated segment with a certain steric hindrance is introduced to provide a steric hindrance effect, preventing re-agglomeration of the powder after dispersion, addressing the issues of insufficient dispersion performance and easy gelation of a slurry at a high solid content.

Furthermore, with a flexible segment introduced into a polymer molecule, the polymer tends toward a linear form, reducing sliding resistance between molecules and improving flexibility. This alleviates the issue of poor flexibility of an electrode plate at a thick coating and a high compacted density, which leads to cracking of the electrode plate.

In other embodiments, the dispersant provided in this application may also be applied to a slurry of another positive electrode active material. For example, the substituent group G can form a hydrogen bond with a phosphate group on a surface of a positive electrode active material such as lithium iron phosphate or lithium manganese iron phosphate, or form a hydrogen bond with a hydroxyl group on a surface of a ternary positive electrode active material; or, the substituent group G can also form a hydrogen bond with a functional group such as a hydroxyl or a carboxyl on a surface of a conductive agent such as carbon nanotubes or graphene. In other words, a dispersant with a different molecular structure can be selected based on a type of the positive electrode active material.

This application further provides a positive electrode slurry, where the positive electrode slurry includes a positive electrode active material, a dispersant, and a solvent, where the dispersant is a dispersant according to any one of the foregoing embodiments, or a dispersant prepared using the preparation method of the dispersant according to any one of the foregoing embodiments. The positive electrode slurry has good dispersion performance, which is beneficial for improving the uniformity and flexibility of the positive electrode plate.

In one embodiment, the dispersant accounts for 0.01%-3.0% of a total weight of the positive electrode slurry. For example, the dispersant may account for 0.01%, 0.05%, 0.1%, 0.16%, 0.2%, 0.5%, 0.8%, 1.0%, 1.5%, 2.0%, 2.5%, 3.0%, and the like, or a range composed of any two of the above values, such as 0.01%-0.05%, 0.1%-0.16%, 0.1%-0.2%, 0.8%-1.0%, 2.5%-3.0%, and the like.

With the dispersant accounting for a percentage of the total weight of the positive electrode slurry within the above range, a good dispersion effect is achieved for the positive electrode slurry while the flexibility of the positive electrode plate is improved; simultaneously, the impact of the dispersant on the proportion of the positive electrode active material is reduced, which facilitates an increase in the mass proportion of the positive electrode active material, enhancing the energy density and the specific capacity of the battery.

In one embodiment, the dispersant accounts for 0.03%-2.0% of a total weight of the positive electrode slurry. For example, the dispersant may account for 0.03%, 0.05%, 0.1%, 0.16%, 0.2%, 0.25%, 0.5%, 0.8%, 1.0%, 1.5%, 2.0%, and the like, or a range composed of any two of the above values, such as 0.03%-0.05%, 0.1%-0.16%, 0.2%-0.25%, 0.8%-1.0%, 1.5%-2.0%, and the like.

With the dispersant accounting for a percentage of the total weight of the positive electrode slurry within the above range, a good dispersion effect is achieved for the positive electrode slurry; simultaneously, the impact of the dispersant on the proportion of the positive electrode active material is reduced, which facilitates an increase in the mass proportion of the positive electrode active material, enhancing the energy density and the specific capacity of the battery.

In one embodiment, a viscosity of the positive electrode slurry is in a range of 4000 mPa·s-30000 mPa·s. For example, the viscosity of the positive electrode slurry may be 4000 mPa·s, 4500 mPa·s, 5000 mPa·s, 6000 mPa·s, 8000 mPa·s, 10000 mPa·s, 12500 mPa·s, 15000 mPa·s, 20000 mPa·s, 22000 mPa·s, 26000 mPa·s, 29500 mPa·s, 30000 mPa's, and the like, or a range composed of any two of the above values, such as 4000 mPa·s-4500 mPa·s, 6000 mPa·s-8000 mPa·s, 12500 mPa·s-15000 mPa·s, 22000 mPa·s-26000 mPa·s, 29500 mPa·s-30000 mPa·s, and the like.

With the viscosity of the positive electrode slurry within the above range, the slurry does not easily precipitate and has good dispersion performance, while also providing good leveling properties, which aids in coating.

In one embodiment, a solid content of the positive electrode slurry is in a range of 55%-65%. For example, the solid content of the positive electrode slurry may be 55%, 55.6%, 56.4%, 58%, 60%, 62.3%, 62.5%, 63%, 65%, and the like, or a range composed of any two of the above values, such as 55%-55.6%, 56.4%-60%, 62.3%-65%, and the like. The above solid content is beneficial for improving the stability of the positive electrode slurry, and can also reduce the coating thickness and lower the internal resistance of the battery.

In some embodiments, a method for preparing the positive electrode slurry is as follows: a positive electrode active material, a conductive agent, a binder, a dispersant, a solvent, and other functional components are added to a mixing tank in a certain proportion and feeding order, then dispersed and mixed to uniformity to obtain a slurry suspension system.

The positive electrode slurry prepared is free from layering, and exhibits no significant viscosity rebound upon standing, no sedimentation during slow stirring, and no gelation phenomenon.

This application further provides a positive electrode plate, where the positive electrode plate includes a current collector and a positive electrode material layer disposed on the current collector, where the positive electrode material layer includes a positive electrode active material and a dispersant, the dispersant being a dispersant of any one of the above embodiments or a dispersant prepared by the preparation method of the dispersant according to any one of the above embodiments. The positive electrode plate has good uniformity and flexibility; without compromising the structural stability of the positive electrode plate, the coating thickness and the compacted density of the positive electrode plate can be increased, thereby enhancing the energy density of the battery.

In some embodiments, the positive electrode slurry from any one of the above embodiments is applied onto the positive electrode current collector, dried in an oven to obtain a positive electrode film, and then cold-pressed according to a designed compaction thickness to produce the positive electrode plate.

In some embodiments, the electrochemical apparatus according to this application is not particularly limited to any purpose, and may be used for any known electronic apparatus in the prior art. The battery disclosed in the embodiments of this application can be used for electric devices that use a battery as a power source or various energy storage systems that use a battery as an energy storage element. In other words, an electric device is provided. In some embodiments, the electric device of this application may be used without limitation in notebook computers, pen-input computers, mobile computers, electronic book players, portable telephones, portable fax machines, portable copiers, portable printers, stereo headsets, video recorders, liquid crystal display televisions, portable cleaners, portable CD players, mini-disc players, transceivers, electronic notebooks, calculators, storage cards, portable recorders, radios, backup power sources, motors, automobiles, motorcycles, motor bicycles, bicycles, ships, spacecraft, lighting appliances, toys, game machines, clocks, electric tools, flash lamps, cameras, large household batteries, lithium-ion capacitors, and the like.

For the electric device, its usage requirements may be used to select the battery cell, the battery module, or the battery pack.

Figure 3:
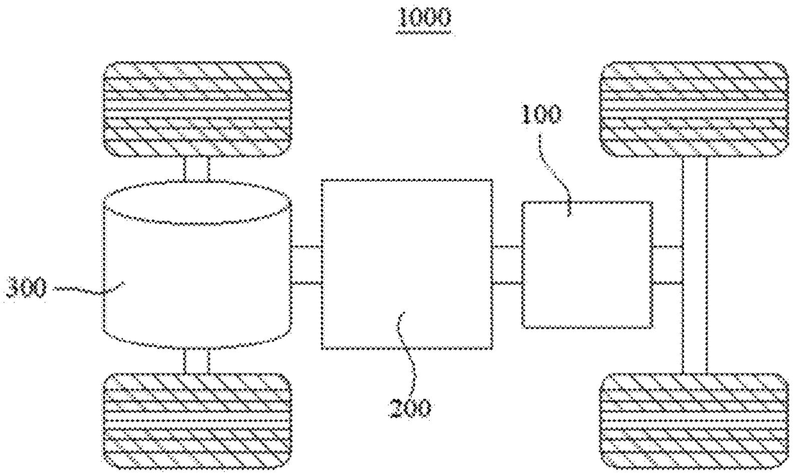
FIG. 3 is a schematic structural diagram of a vehicle according to one or multiple embodiments of this application.

Referring to FIG. 3, FIG. 3 is a schematic structural diagram of a vehicle according to one or more embodiments. The vehicle 1000 may be a fossil fuel vehicle, a natural-gas vehicle, or a new energy vehicle, where the new energy vehicle may be a battery electric vehicle, a hybrid electric vehicle, a range-extended vehicle, or the like. The vehicle 1000 is provided with a battery 100 inside, and the battery 100 may be disposed at the bottom, front, or rear of the vehicle 1000. The battery 100 may be configured to supply power to the vehicle 1000. For example, the battery 100 may be used as an operational power supply for the vehicle 1000. The vehicle 1000 may further include a controller 200 and a motor 300, where the controller 200 is configured to control the battery 100 to supply power to the motor 300, for example, to satisfy power needs of start, navigation, and driving of the vehicle 1000.

In some embodiments of this application, the battery 100 can be used as not only the operational power supply for the vehicle 1000 but also a driving power source for the vehicle 1000, replacing or partially replacing fossil fuel or natural gas to provide driving traction for the vehicle 1000.

To describe the technical problems solved by the embodiments of this application, technical solutions, and beneficial effects of this application more clearly, the following gives further description in detail with reference to the embodiments and accompanying drawings. Apparently, the described embodiments are only some but not all of the embodiments of this application. The following description of at least one exemplary embodiment is merely illustrative and definitely is not construed as any limitation on this application or on use of this application. All other embodiments obtained by a person of ordinary skill in the art based on the embodiments of this application without creative efforts shall fall within the protection scope of this application.

Example 1

I. Preparation of Dispersant (1) A polycondensation reaction was performed using a triacid and a diol as monomers. Here, a small amount of alcohol was added, where the alcohol was subjected to an esterification reaction with the triacid to obtain a diacid containing an ester group at a side chain

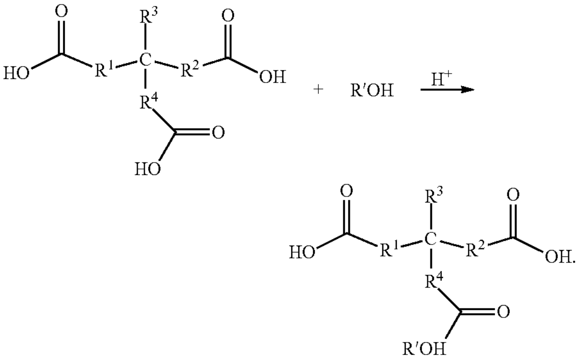

(2) Subsequently, the diacid and the diol were subjected to a polycondensation reaction under catalysis of concentrated sulfuric acid to obtain a polyester product containing a side chain. Here, the degree of polymerization could be controlled through adjusting reaction conditions and the feed ratio. Extending the reaction time and increasing the reaction temperature appropriately could enhance the degree of polymerization. Thereafter, a hydroxyl group at one end of the polyester reacted with a halogenated compound under catalysis of a base to achieve capping. Subsequently, two molecules of the capped polyester and phosphorus oxychloride were subjected to a phosphonic esterification reaction to obtain a phosphonic ester product with a symmetric structure. Finally, the phosphonic ester product was subjected to a hydrolysis reaction with a small amount of water in the system to obtain a dispersant 1.

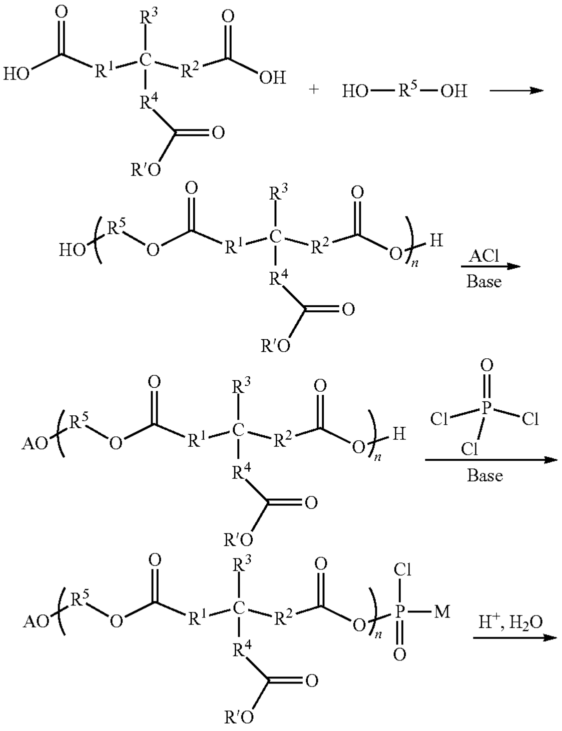

-continued

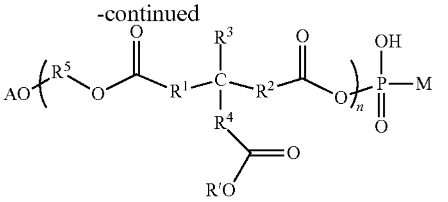

II. Preparation of Lithium-Ion Battery

1. A positive electrode active material lithium iron phosphate, a conductive agent acetylene black, a binder PVDF, and a dispersant 1 were weighed according to a weight ratio of 97.5:1.5:0.5:0.5. After being thoroughly stirred and mixed to uniformity in a solvent system of N-methylpyrrolidone, the mixture was applied onto an Al foil using extrusion coating or transfer coating, followed by drying and cold pressing to obtain a positive electrode plate.
2. A negative electrode active material artificial graphite, a conductive agent acetylene black, a binder carboxymethyl cellulose, and a dispersant styrene-butadiene rubber were weighed according to a weight ratio of 96:2:1:1. After being thoroughly stirred and mixed to uniformity in a solvent system of deionized water, the mixture was applied onto a Cu foil, followed by drying and cold-pressing to obtain a negative electrode plate.
3. A PE porous polymer film was used as a separator. The positive electrode plate, the separator, and the negative electrode plate were wound in sequence and according to dimensions to form a battery cell, followed by packaging, electrolyte injection, formation, and degassing, to obtain a lithium-ion battery.

Example 2

The preparation of the polyester is the same as the preparation of the polyester in Example 1. The difference is that in phosphonic esterification, a ratio of phosphorus oxychloride to polyester segment was controlled as 1:1.05.

Example 3

The previous steps are the same as the previous steps in Example 1. In the step of introducing an anchoring group, a reaction with $ClC_4H_9COOH$ was performed similarly under catalysis of a base to introduce an anchoring group. The subsequent steps are also the same as the subsequent steps in Example 1.

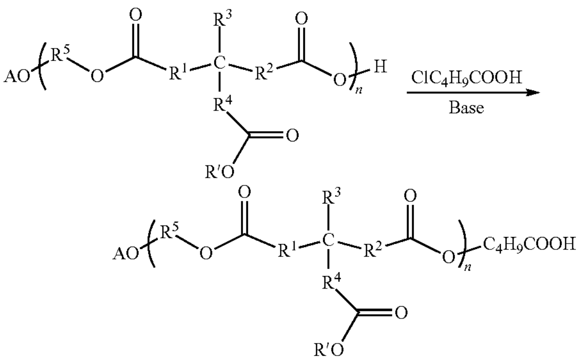

Example 4

The previous steps are the same as the previous steps in Example 1. In the step of introducing an anchoring group, a reaction with $ClC_4H_9SO_3H$ was performed similarly under catalysis of a base to introduce an anchoring group. The subsequent steps are also the same as the subsequent steps in Example 1.

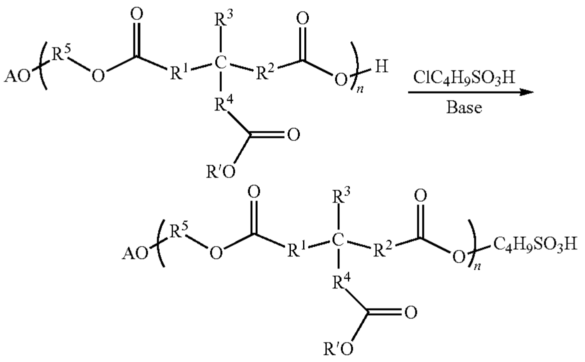

Examples 5-8

The difference from Example 1 is that the solvated segment groups R1, R2, R3, R4, R5 of the dispersant were changed.

Examples 9-10

The difference from Example 1 is that the degree of polymerization of the polyester compound was adjusted.

Example 11

The difference from Example 1 is that the backbone structure of the polyester compound was adjusted.

Example 12

The difference from Example 1 is that the addition amount of the dispersant was adjusted.

Comparative Example

1. A positive electrode active material lithium iron phosphate, a conductive agent acetylene black, a binder PVDF, and a dispersant styrene-butadiene rubber were weighed according to a weight ratio of 97.5:1.5:0.5:0.5. After being thoroughly stirred and mixed to uniformity in a solvent system of N-methylpyrrolidone, the mixture was applied onto an Al foil using extrusion coating or transfer coating, followed by drying and cold pressing to obtain a positive electrode plate.
2. A negative electrode active material artificial graphite, a conductive agent acetylene black, a binder carboxymethyl cellulose, and a dispersant styrene-butadiene rubber were weighed according to a weight ratio of 96:2:1:1. After being thoroughly stirred and mixed to uniformity in a solvent system of deionized water, the mixture was applied onto a Cu foil, followed by drying and cold-pressing to obtain a negative electrode plate.

3. A PE porous polymer film was used as a separator. The positive electrode plate, the separator, and the negative electrode plate were wound in sequence and according to dimensions to form a battery cell, followed by packaging, electrolyte injection, formation, and degassing, to obtain a lithium-ion battery.

Performance Test

1. Material Characterization (1) Infrared Characterization of the Dispersant

The battery was disassembled, and the positive electrode plate was removed. An organic solvent was selected to treat the material layer of the positive electrode plate to remove inorganic materials, and dissolve and separate organic substances. Chromatography separation technology was utilized to separate and purify the organic substances to obtain a polyester compound, and a qualitative test was performed. The measurement was conducted using a Bruker Tensor37 infrared spectrometer. A spectrally pure potassium bromide pellet was used as a carrier. A sample solution to be tested was dropped onto the potassium bromide pellet or mixed with potassium bromide during grinding and pressed into a pellet. The infrared scanning range was 4000 $cm^{-1}$ to 400 $cm^{-1}$, the scanning resolution was 16 $cm^{-1}$, and the scan was repeated 16 times.

(2) Weight-Average Molecular Weight Test of Dispersant

A Waters 2695 Isocratic HPLC gel permeation chromatograph (differential refractive index detector 2141) was used. A polystyrene solution with a mass percentage of 3.0% was used as a reference sample, and a matching chromatographic column (oil-based: Styragel HT5 DMF 7.8*300 mm+Styragel HT4) was selected. A 3.0% polymer solution was prepared with a purified N-methylpyrrolidone (NMP) solvent, and the prepared solution was left standing for one day before use. During the test, tetrahydrofuran was first drawn with a syringe for rinsing, and this step was repeated several times. Then, 5 ml of the test solution was drawn, air in the syringe was expelled, and the needle tip was wiped dry. The sample solution was then slowly injected into an injection port. Data were acquired after the readings stabilized.

(3) Degree of Polymerization Testing

After the weight-average molecular weight data of the dispersant were obtained, the degree of polymerization of the dispersant was calculated in combination with the mass of the monomer.

2. Positive Electrode Slurry Performance Test (1) Slurry Solid Content

A copper foil was weighed in a weight loss rate measuring instrument and the result was recorded as M0. Then the instrument was zeroed.

A small amount of the positive electrode slurry was applied onto the copper foil, and the coated coper foil was placed in a moisture analyzer and weighed, with the result recorded as M1. The device was closed, and drying was started. After drying was completed, the weight data were recorded as M2, and the solid content was calculated as (M2−M0)/(M1−M0).

(2) Slurry Stability Test

After the slurry was restirred for 30 minutes, a certain amount of the slurry was poured into a sample bottle of a stability analyzer. The sample bottle was placed in the analyzer, the test tower lid was closed, and the test tower was then opened. The test interface began displaying a scanning curve, and the stability testing of the sample was started; the test continued for over 72 hours to complete the testing.

(3) Slurry Viscosity

A rotational viscometer, model DV-2TLV Brookfield viscometer, was used. An appropriate rotor was selected based on the viscosity of the slurry, and the parameter was adjusted to 12 r/min. After the measurement started, the screen readings were observed. When the numbers no longer fluctuated significantly and the measurement progress bar on the right rose from the bottom to the top, the data were recorded.

3. Battery Performance Test (1) Positive Electrode Plate Brittleness Test

A defect-free positive electrode plate was selected and cut longitudinally into samples with a length of 20 cm and a width of 2.5 cm, with a sample count of 8 or more. The samples were pre-folded, and a membrane was placed on a testing platform. A 2 kg cylindrical pressure roller was used to roll over the membrane once. If light passed through, the brittleness light transmission count was recorded as 1 time. If no light passed through, the reverse folding and rolling were repeated. The crease was observed against light to check for light transmission or breakage, and the actual number of folds was recorded. The average value was taken as the test result.

(2) Sheet Resistance

The dried positive electrode slurry (membrane layer) was cut from the left, middle, and right sections of the positive electrode plate into small discs with a diameter of 3 mm. The power of a plate resistance meter was turned on, and a disc was placed at an appropriate position under the “probe” of the resistance meter. The “Start” button was pressed, and readings were taken once stabilized. Two positions were tested for each small disc, and the average of six measurements was calculated as the resistance of the membrane layer of the plate.

(3) First Coulombic Efficiency

At 25° C., a battery from the above examples and comparative examples was charged at a constant current rate of 0.1C to a voltage of 4.3V. The charging capacity at this point was recorded as the first-cycle charging capacity of the secondary battery. The battery was then left standing for 5 min, discharged at a constant current rate of 0.1C to a voltage of 2.0V, and then left standing for 5 min. This completed one charge-discharge cycle, and the discharge capacity of this cycle was recorded as the first-cycle discharge capacity of the secondary battery, which was also the initial capacity of the secondary battery.

$$\text{The first-cycle coulombic efficiency of the secondary battery (\%)} = \text{first-cycle discharge capacity/first-cycle charging capacity} \times 100\%.$$

(4) 45° C. Cycle Capacity Retention Rate

At 45° C., a battery from the examples and comparative examples was charged at a constant current of ⅓C to 3.65V, then charged at a constant voltage of 3.65V to a current of 0.05C, left standing for 10 min, and discharged at ⅓C to 2.5V. The resulting capacity was recorded as the initial capacity C0. The above steps were repeated for the same battery, and a discharge capacity after the nth cycle was recorded as Cn. The battery capacity retention rate after each cycle was calculated as:

$$Pn = Cn/C0 \times 100\%.$$

In this test, the first cycle corresponds to n=1, the second cycle corresponds to n=2, . . . , and the 100-th cycle corresponds to n=100. The corresponding battery capacity retention rate data corresponding to Example 1, that is, the value of P300 in Table 1 are measured after 300 cycles under the preceding test conditions.

TABLE 1

Parameter table for dispersants of examples and comparative examples

| | Feed ratio | Degree of polymerization | Polyester type | R1/R2/R5 | R3/R4 | G | Ratio (%) |
|---|---|---|---|---|---|---|---|
| Example 1 | 50:60:1 | 50 | Formula 1 | $—(EO)_6(PO)_3—$ | $—(EO)_6(PO)_3—$ | $—O—P(O)OH—O—$ | 0.5 |
| Example 2 | 50:60:1 | 50 | Formula 1 | $—(EO)_6(PO)_3—$ | $—(EO)_6(PO)_3—$ | $—O—P(O)OH_2$ | 0.5 |
| Example 3 | 50:60:1 | 50 | Formula 1 | $—(EO)_6(PO)_3—$ | $—(EO)_6(PO)_3—$ | $—C_4H_9COOH$ | 0.5 |
| Example 4 | 50:60:1 | 50 | Formula 1 | $—(EO)_6(PO)_3—$ | $—(EO)_6(PO)_3—$ | $—C_4H_9SO_3H$ | 0.5 |
| Example 5 | 50:60:1 | 50 | Formula 1 | $—(EO)_9—$ | $—(EO)_6(PO)_3—$ | $—O—P(O)OH—O—$ | 0.5 |
| Example 6 | 50:60:1 | 50 | Formula 1 | $—(CH_2)_9—$ | $—(EO)_6(PO)_3—$ | $—O—P(O)OH—O—$ | 0.5 |
| Example 7 | 50:60:1 | 50 | Formula 1 | $—(CH_2)_9—$ | $—(EO)_9—$ | $—O—P(O)OH—O—$ | 0.5 |
| Example 8 | 50:60:1 | 50 | Formula 1 | $—(CH_2)_9—$ | $—C_9H_{18}—$ | $—O—P(O)OH—O—$ | 0.5 |
| Example 9 | 20:25:1 | 20 | Formula 1 | $—(EO)_6(PO)_3—$ | $—(EO)_6(PO)_3—$ | $—O—P(O)OH—O—$ | 0.5 |
| Example 10 | 80:90:1 | 80 | Formula 1 | $—(EO)_6(PO)_3—$ | $—(EO)_6(PO)_3—$ | $—O—P(O)OH—O—$ | 0.5 |
| Example 11 | 50:60:1 | 50 | Formula 2 | $—(EO)_6(PO)_3—$ | $—(EO)_6(PO)_3—$ | $—O—P(O)OH—O—$ | 0.5 |
| Example 12 | 50:60:1 | 50 | Formula 1 | $—(EO)_6(PO)_3—$ | $—(EO)_6(PO)_3—$ | $—O—P(O)OH—O—$ | 1.5 |

Note: The feed ratio refers to a molar ratio of a polyacid monomer, a polyol monomer, and a halogenated compound. "EO" refers to a polyoxyethylene ether segment. "PO" refers to a polyoxypropylene ether segment. The polyester type indicates a backbone structure of a polyester compound, with formula 1 being

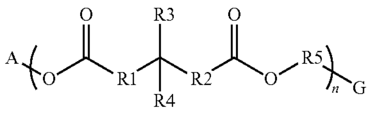

and formula 2 being

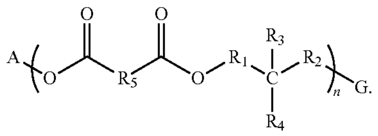

A "ratio" refers to a proportion of a dispersant in a total weight of the positive electrode slurry.

TABLE 2

Performance parameter table for examples and comparative examples

| Group | Solid content | Gelation condition after standing for 24 h | Coating cracking condition | Electrode plate brittleness (number of folds until light transmission) (times) | sheet resistance (Ω) | Initial coulombic efficiency (%) | Capacity retention rate at 45° C. cycling @ 300 cycles (%) |
|---|---|---|---|---|---|---|---|
| Example 1 | 63.9% | No gelation | No cracking | 6 | 0.123 | 93.28% | 94.33% |
| Example 2 | 62.3% | Slight gelation | No cracking | 4 | 0.138 | 92.65% | 92.83% |
| Example 3 | 63.3% | No gelation | No cracking | 6 | 0.123 | 93.33% | 93.84% |
| Example 4 | 63.1% | No gelation | No cracking | 6 | 0.126 | 93.20% | 94.12% |
| Example 5 | 62.1% | Slight gelation | No cracking | 4 | 0.133 | 92.11% | 92.58% |
| Example 6 | 62.3% | Slight gelation | No cracking | 4 | 0.137 | 92.39% | 92.72% |
| Example 7 | 61.2% | Slight gelation | No cracking | 4 | 0.143 | 92.13% | 91.77% |
| Example 8 | 60.4% | Moderate gelation | No cracking | 4 | 0.146 | 91.22% | 91.42% |
| Example 9 | 61.4% | Moderate gelation | No cracking | 3 | 0.148 | 91.87% | 91.72% |
| Example 10 | 61.5% | Moderate gelation | No cracking | 3 | 0.146 | 91.74% | 91.59% |
| Example 11 | 63.6% | No gelation | No cracking | 6 | 0.123 | 93.79% | 93.99% |
| Example 12 | 60.4% | No gelation | No cracking | 3 | 0.151 | 90.85% | 90.75% |

TABLE 2-continued

Performance parameter table for examples and comparative examples

| Group | Solid content | Gelation condition after standing for 24 h | Coating cracking condition | Electrode plate brittleness (number of folds until light transmission) (times) | sheet resistance (Ω) | Initial coulombic efficiency (%) | Capacity retention rate at 45° C. cycling @ 300 cycles (%) |
|---|---|---|---|---|---|---|---|
| Comparative example 1 | 52.1% | Heavy gelation | Cracking present | 1 | 0.337 | 90.14% | 89.13% |

Note:
"Plate brittleness" refers to the number of folds until light transmission of positive electrode plate; "Capacity retention rate" refers to the capacity retention rate after 300 cycles under a condition of 45° C.

III. Analysis of Test Results for Positive Electrode Plate and Battery Performance From the data of the above examples, it can be concluded that the dispersant provided by this application can achieve good dispersion of the positive electrode slurry. When applied to a positive electrode plate, the dispersant enables good flexibility of the positive electrode plate, which facilitates an increase in the stability of the battery. The resistance of the positive electrode plate is also reduced, which facilitates an increase in the initial coulombic efficiency and the capacity retention rate of the battery.

Furthermore, the dispersion effect of the dispersant can be adjusted by controlling the type of the anchoring group, the type of the solvated segment, the degree of polymerization and the addition amount of the dispersant: from comparison of Examples 1-4, it can be seen that different anchoring groups G all exhibit good effects, where a bis-ester phosphonic acid (Example 1) outperforms a mono-ester phosphonic acid (Example 2); from comparison of Example 1 and Examples 5-8, it can be seen that with different solvated segments screened, the polyester compound containing a polyoxyethylene ether and polyoxypropylene ether segment (Example 1) outperforms the polyester compound containing a pure polyoxyethylene ether and an alkyl segment (Examples 5-7), and are further superior to the polyester compound containing an alkyl segment and an alkyl segment (Example 8); from comparison of Example 1 and Examples 9-10, it can be seen that polyester compounds with different degrees of polymerization all exhibit good effects; and from comparison of Example 1 and Example 12, it can be seen that polyester compounds with different addition amounts all exhibit good effects.

The foregoing descriptions are merely some embodiments of this application, but are not intended to limit the patent scope of this application. Any equivalent structural or process transformation made based on the content of the specification and accompanying drawings of this application and any direct or indirect use of this application in other related technical fields shall all fall within the patent protection scope of this application in the same way.

What is claimed is:

1. A battery, wherein the battery comprises a positive electrode plate, the positive electrode plate comprises a current collector and a positive electrode material layer provided on at least one side of the current collector, the positive electrode material layer comprises a positive electrode active material and a dispersant, the dispersant comprises a polyester compound, the polyester compound comprises a structural unit A and/or a structural unit B, the structural unit A has a chemical formula of

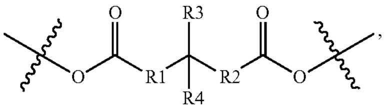, and the structural unit B has a chemical formula of

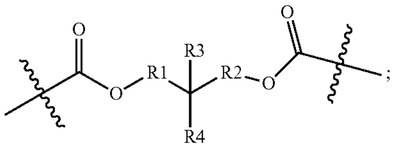;

wherein

R1 and R2 are each selected from C0, a C1-C18 alkyl group, a C6-C18 aryl group, and an ester group; and R3 and R4 are each selected from at least one of H, a C1-C18 alkyl group, a C6-C18 aryl group, and an ester group.

2. The battery according to claim 1, wherein the ester group has a chemical formula of

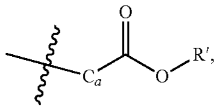, wherein 0≤a≤6, and R' is selected from any one of a C1-C18 alkyl group, a C6-C18 aryl group, a polyoxyethylene ether segment, and a polyoxyethylene ether polyoxypropylene ether copolymer segment.

3. The battery according to claim 2, wherein the polyoxyethylene ether polyoxypropylene ether copolymer segment comprises

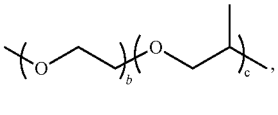, wherein 3<b≤60 and 0<c≤60.

4. The battery according to claim 1, wherein the positive electrode active material comprises one or more of lithium iron phosphate and lithium manganese iron phosphate.

5. The battery according to claim 1, wherein
a coating weight of the positive electrode material layer is in a range of 300 g/1540.25 $mm^2$-450 g/1540.25 $mm^2$;
a compacted density of the positive electrode material layer is in a range of 2.4 $g/cm^3$-2.8 $g/cm^3$; and/or
a sheet resistance of the positive electrode plate is in a range of 0.05Ω-0.30Ω.

6. The battery according to claim 1, wherein the polyester compound comprises a structural unit C and/or a structural unit D, the structural unit C has a chemical formula of

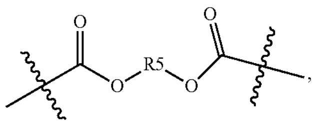

and the structural unit D has a chemical formula of

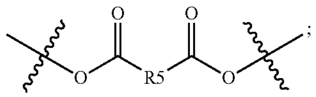

wherein
R5 is selected from any one of a C1-C18 alkyl group, a C6-C18 aryl group, and an ester group.

7. The battery according to claim 1, wherein the polyester compound further comprises at least one substituent group G, and G comprises any one of a carboxyl group and a derivative thereof, a sulfonic acid group and a derivative thereof, and a phosphonic acid group and a derivative thereof, wherein
G is a terminal group of the polyester compound;
the carboxyl group and the derivative thereof have a chemical formula of

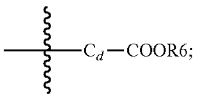

and/or
the sulfonic acid group and the derivative thereof have a chemical formula of

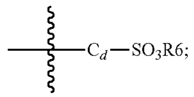

wherein
a value of d ranges from greater than 1 and less than or equal to 12, and R6 is selected from any one of H, an alkyl group, alkyl alcohol, alkyl hydroxylamine, a fatty ester group, and an aromatic ester group; wherein
the alkyl group has a chemical formula of

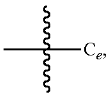

the alkyl alcohol has a chemical formula of

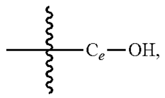

the alkyl hydroxylamine has a chemical formula of

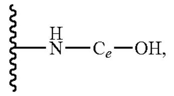

the fatty ester group has a chemical formula of

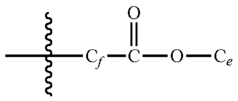
or
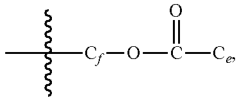

the aromatic ester group has a chemical formula of

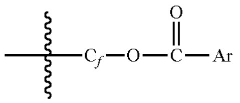
or
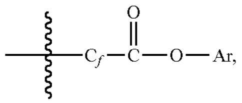

a value of e is in a range of 1-12, a value of f is in a range of 1-16, and carbon atoms in Ar have a quantity of not exceeding 12.

8. The battery according to claim 7, wherein
the phosphonic acid group and the derivative thereof have a chemical formula of

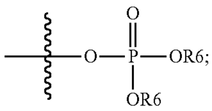

wherein
R6 is selected from any one of H, an alkyl group, alkyl alcohol, alkyl hydroxylamine, a fatty ester group, and an aromatic ester group; where
the alkyl group has a chemical formula of

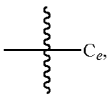

the alkyl alcohol has a chemical formula of

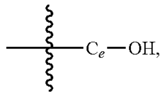

the alkyl hydroxylamine has a chemical formula of

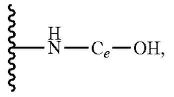

the fatty ester group has a chemical formula of

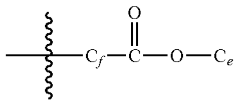

or

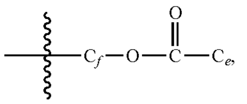

the aromatic ester group has a chemical formula of

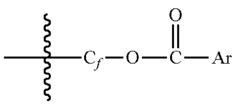

or

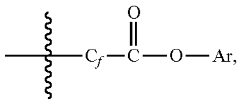

a value of is in a range of 1-12, a value of f is in a range of 1-16, and carbon atoms in Ar have a quantity of not exceeding 12.

9. The battery according to claim 1, wherein the dispersant comprises a structure shown in formula (1) or a structure shown in formula (2):

(1)

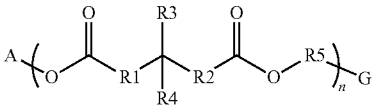

and (2)

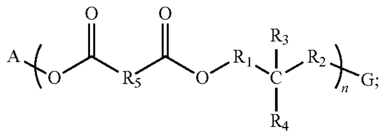

wherein a value of n is in a range of 3-100, and A is a capping group, wherein the capping group comprises one or more of an alkoxy group

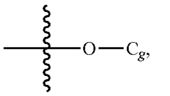

a phenylalkoxy group

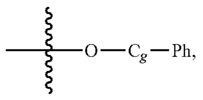

an ester group

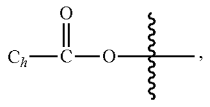

an ester group

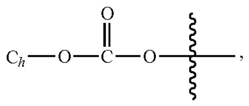

an amide group

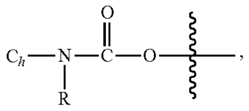

hydroxyl-OH, amino-$NH_2$, and carboxyl-COOH, a value of g is in a range of 1-12, $C_h$ is an alkyl segment or an aryl-containing segment, a value of h is in a range of 1-18, and R is H, a C1-C12 alkyl group, or a C6-C12 aryl group, R1 and R2 are each selected from C0, a C1-C18 alkyl group, a C6-C18 aryl group, and an ester group; and R3 and R4 are each selected from at least one of H, a C1-C18 alkyl group, a C6-C18 aryl group, and an ester group, R5 is selected from any one of a C1-C18 alkyl group, a C6-C18 aryl group, and an ester group, G is a substituent group comprising at least one of a carboxyl group and a derivative thereof, a sulfonic acid group and a derivative thereof, and a phosphonic acid group and a derivative thereof, wherein in the polyester compound, a weight percentage of the substituent group G is less than 15%, a weight percentage of solvated segments R1, R2, R3, R4, and R5 is less than 65%, and a weight percentage of a polyester group is 3%-30%, wherein a weight-average molecular weight of the polyester compound is in a range of 500-100000, wherein the weight-average molecular weight of the polyester compound is in a range of 2000-50000.

10. A positive electrode slurry, comprising a positive electrode active material, a dispersant, and a solvent, wherein the dispersant comprises a polyester compound, the polyester compound comprises a structural unit A and/or a structural unit B, the structural unit A has a chemical formula of

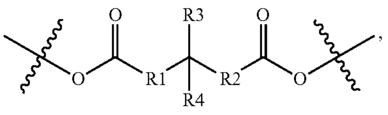

and the structural unit B has a chemical formula of

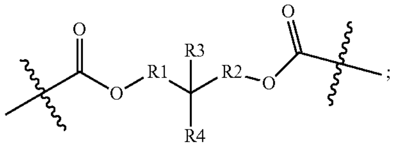

wherein

R1 and R2 are each selected from at least one of C0, a C1-C18 alkyl group, and a C6-C18 aryl group; and R3 and R4 are each selected from H, a C1-C18 alkyl group, a C6-C18 aryl group, and an ester group, wherein the dispersant accounts for 0.01%-3.0% of a total weight of the positive electrode slurry, wherein the dispersant accounts for 0.03%-2.0% of the total weight of the positive electrode slurry.

11. The positive electrode slurry according to 10, wherein a viscosity of the positive electrode slurry is in a range of 4000 mPa·s-30000 mPa·s.

12. The positive electrode slurry according to claim 10, wherein a solid content of the positive electrode slurry is in a range of 55%-65%.

13. A dispersant, comprising a polyester compound, wherein the polyester compound comprises a structural unit A and/or a structural unit B, the structural unit A has a chemical formula of

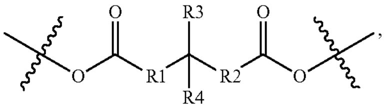

and the structural unit B has a chemical formula of

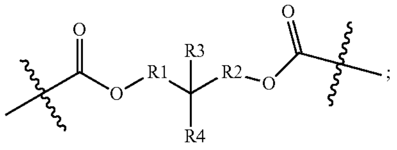

wherein

R1 and R2 are each selected from at least one of C0, a C1-C18 alkyl group, and a C6-C18 aryl group; and R3 and R4 are each selected from H, a C1-C18 alkyl group, a C6-C18 aryl group, and an ester group, wherein the polyester compound further comprises at least one substituent group G, and G comprises at least one of a sulfonic acid group and a derivative thereof, and a phosphonic acid group and a derivative thereof, wherein G is a terminal group of the polyester compound;

the sulfonic acid group and the derivative thereof have a chemical formula of

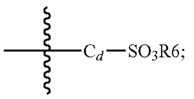

the phosphonic acid group and the derivative thereof have a chemical formula of

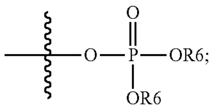

wherein

R6 is selected from any one of H, an alkyl group, alkyl alcohol, alkyl hydroxylamine, a fatty ester group, and an aromatic ester group; where the alkyl group has a chemical formula of

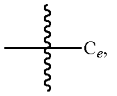

the alkyl alcohol has a chemical formula of

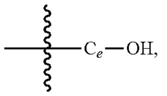

the alkyl hydroxylamine has a chemical formula of

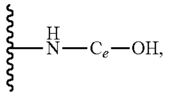

the fatty ester group has a chemical formula of

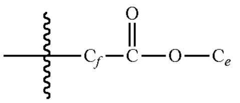 or 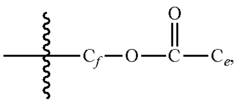

the aromatic ester group has a chemical formula of

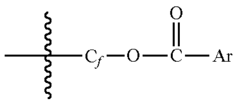 or 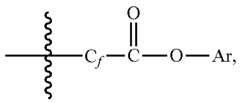

a value of e is in a range of 1-12, a value of f is in a range of 1-16, and carbon atoms in Ar have a quantity of not exceeding 12, wherein a value of d ranges from greater than 1 and less than or equal to 12.

14. The dispersant according to claim 13, wherein the polyester compound comprises a structural unit C and/or a structural unit D, the structural unit C has a chemical formula of

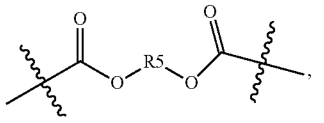

and the structural unit D has a chemical formula of

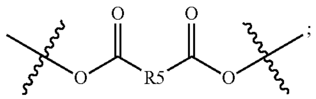

wherein

R5 is selected from any one of a C1-C18 alkyl group and a C6-C18 aryl group.

15. An electric device, wherein the electric device comprises the battery according to claim 1.

16. The dispersant according to claim 13, wherein the ester group has a chemical formula of

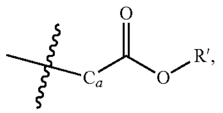

wherein $0 \leq a \leq 6$, and R' is selected from any one of a C1-C18 alkyl group, a C6-C18 aryl group, a polyoxyethylene ether segment, and a polyoxyethylene ether polyoxypropylene ether copolymer segment.

17. The dispersant according to claim 16, wherein the polyoxyethylene ether polyoxypropylene ether copolymer segment comprises

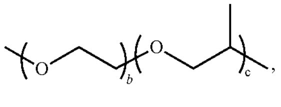

wherein $3 < b \leq 60$ and $0 < c \leq 60$.

18. The dispersant according to claim 13, wherein the dispersant comprises a structure shown in formula (1) or a structure shown in formula (2):

(1)

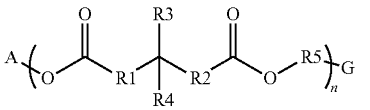

and (2)

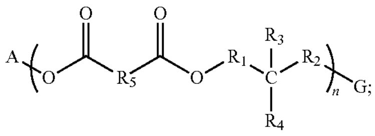

wherein a value of n is in a range of 3-100, and A is a capping group, wherein the capping group comprises one or more of an alkoxy group

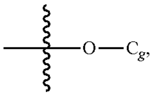

a phenylalkoxy group

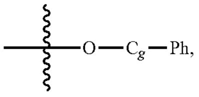

an ester group

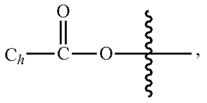

an ester group

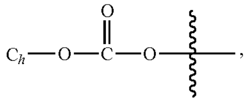

an amide group

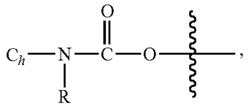

hydroxyl-OH, amino-$NH_2$, and carboxyl-COOH, a value of g is in a range of 1-12, $C_h$ is an alkyl segment or an aryl-containing segment, a value of h is in a range of 1-18, and R is H, a C1-C12 alkyl group, or a C6-C12 aryl group, R5 is selected from any one of a C1-C18 alkyl group, a C6-C18 aryl group, and an ester group, wherein in the polyester compound, a weight percentage of the substituent group G is less than 15%, a weight percentage of solvated segments R1, R2, R3, R4, and R5 is less than 65%, and a weight percentage of a polyester group is 3%-30%, wherein a weight-average molecular weight of the polyester compound is in a range of 500-100000, wherein the weight-average molecular weight of the polyester compound is in a range of 2000-50000.

* * * * *